United States Patent
Noonan et al.

(10) Patent No.: US 7,631,443 B2
(45) Date of Patent: Dec. 15, 2009

(54) WHEELED SHOVEL WITH HINGE APPARATUS

(75) Inventors: Mark Noonan, New Canaan, CT (US); Stephen C. Fog, New Canaan, CT (US)

(73) Assignee: Snow Solutions LLC, New Canaan, CT (US)

( * ) Notice: Subject to any disclaimer, the term of this patent is extended or adjusted under 35 U.S.C. 154(b) by 189 days.

(21) Appl. No.: 11/955,753

(22) Filed: Dec. 13, 2007

(65) Prior Publication Data

US 2009/0139115 A1 Jun. 4, 2009

Related U.S. Application Data

(60) Provisional application No. 60/991,218, filed on Nov. 29, 2007.

(51) Int. Cl.
 *E01H 5/02* (2006.01)
(52) U.S. Cl. .......................................... 37/265; 37/285
(58) Field of Classification Search ................... 37/265, 37/284, 285, 264, 278, 273; 172/354, 365, 172/358, 371–380; 294/54.4, 54.8, 57
See application file for complete search history.

(56) References Cited

U.S. PATENT DOCUMENTS

| | | |
|---|---|---|
| 237,410 A | 2/1881 | Rouse |
| 328,633 A | 10/1885 | Angell |
| 617,830 A | 1/1899 | Herran |
| 909,521 A | 1/1909 | Bearinger |
| 998,517 A | 7/1911 | Humm |
| 1,514,076 A | 11/1924 | Brown |
| 1,683,732 A | 9/1928 | Selin |
| 2,432,780 A | 12/1947 | Mader |
| 2,441,449 A | 5/1948 | Shaw |

(Continued)

FOREIGN PATENT DOCUMENTS

CA 2501109 9/2005

(Continued)

OTHER PUBLICATIONS

U.S. design patent U.S. Appl. No. 29/279,588, filed May 3, 2007, Noonan et al, for Wheeled Shovel.

(Continued)

*Primary Examiner*—Robert E Pezzuto
(74) *Attorney, Agent, or Firm*—Harness, Dickey & Pierce, P.L.C.

(57) ABSTRACT

Various exemplary embodiments are provided of hinge apparatus, which may be used, for example, to hingedly connect upper and lower frame members of a device or tool. In one embodiment of a hinge apparatus, first and second linking members each include a base portion, sidewalls, and flange portions. The flange portions define sets of openings configured to receive a portion of a first connector, for selectively adjusting the angular orientation of the upper frame member relative to the lower frame member in an open, ready-for-use configuration. The linking members include connector openings configured to receive a portion of a second connector. When the first connector is not engaged with any set of openings, the upper frame member is pivotably movable relative to the lower frame member about the second connector to a closed, collapsed configuration in which the upper frame member is alongside the lower frame member.

11 Claims, 28 Drawing Sheets

U.S. PATENT DOCUMENTS

| | | | |
|---|---|---|---|
| 2,460,560 A | 2/1949 | Williams |
| 2,470,217 A | 5/1949 | McLoughlin |
| 2,520,606 A | 8/1950 | McLoughlin |
| 2,590,143 A | 3/1952 | Adams, Jr. et al. |
| 2,629,624 A | 2/1953 | Nelles |
| 2,715,786 A | 8/1955 | Dorko |
| 2,720,043 A | 10/1955 | Chamberlin |
| 2,811,792 A | 11/1957 | Cork, Jr. |
| 2,846,785 A | 8/1958 | Underwood |
| 2,852,872 A | 9/1958 | Benz |
| 2,852,873 A | 9/1958 | Benz |
| 2,863,232 A | 12/1958 | Steinbach et al. |
| 2,867,827 A | 1/1959 | Gantz |
| 2,930,152 A | 3/1960 | Pipkin |
| D190,820 S | 7/1961 | O'Connor |
| 3,019,056 A | 1/1962 | Keilman |
| 3,078,604 A | 2/1963 | Neuman |
| 3,097,541 A | 7/1963 | Kindig |
| 3,107,446 A | 10/1963 | Messinger |
| 3,136,574 A | 6/1964 | Pasquale |
| 3,222,699 A | 12/1965 | Zeisig |
| 3,343,807 A | 9/1967 | Moraski |
| 3,452,798 A | 7/1969 | Ravreby |
| 3,468,041 A | 9/1969 | Mattson et al. |
| 3,469,326 A | 9/1969 | Malickson |
| 3,475,838 A | 11/1969 | Hagen et al. |
| 3,526,979 A | 9/1970 | Ladewski |
| 3,594,932 A | 7/1971 | Eriksson |
| 3,643,356 A | 2/1972 | Gohl |
| 3,695,728 A | 10/1972 | Haussels |
| 3,748,761 A | 7/1973 | Chetwynde |
| 3,751,058 A | 8/1973 | Larsen |
| 3,985,392 A | 10/1976 | Bergmann et al. |
| 4,046,184 A | 9/1977 | Diehl |
| 4,055,354 A | 10/1977 | Sharpe |
| 4,153,287 A | 5/1979 | Towsend |
| 4,161,073 A | 7/1979 | Oakes |
| 4,179,828 A | 12/1979 | Brunty |
| 4,214,385 A | 7/1980 | Baranowski et al. |
| 4,224,751 A | 9/1980 | Schoemann et al. |
| 4,231,604 A | 11/1980 | Obergfell |
| D262,259 S | 12/1981 | Terpening |
| 4,302,894 A | 12/1981 | Emma |
| 4,345,633 A | 8/1982 | Gilmore |
| 4,607,860 A | 8/1986 | Vogel |
| 4,690,447 A | 9/1987 | Adams |
| 4,704,758 A | 11/1987 | Hoffman |
| 4,858,348 A | 8/1989 | Lundy |
| 4,865,373 A | 9/1989 | Hudson |
| 4,910,893 A | 3/1990 | Asay |
| D314,318 S | 2/1991 | Uimonen |
| 5,018,282 A | 5/1991 | Hong |
| 5,048,206 A | 9/1991 | Jones |
| 5,054,278 A | 10/1991 | Thorndike |
| 5,074,064 A | 12/1991 | Nickels |
| 5,117,530 A | 6/1992 | Rank |
| 5,123,187 A | 6/1992 | Zamaria |
| 5,159,769 A | 11/1992 | Odorisio |
| 5,279,102 A | 1/1994 | Foster |
| 5,487,530 A | 1/1996 | McCullough |
| 5,499,852 A | 3/1996 | Seigendall |
| 5,511,327 A | 4/1996 | Jurkowski et al. |
| D375,235 S | 11/1996 | Spear et al. |
| D376,965 S | 12/1996 | Spear et al. |
| 5,581,915 A | 12/1996 | Lobato |
| 5,613,354 A | 3/1997 | Foster |
| 5,727,799 A | 3/1998 | DiSario |
| 5,762,405 A | 6/1998 | Dempsey |
| 5,782,240 A | 7/1998 | Raviv |
| 5,782,518 A | 7/1998 | Scruggs |
| 5,782,540 A | 7/1998 | Camfield et al. |
| 5,810,408 A | 9/1998 | Armstrong |
| 5,826,948 A | 10/1998 | Schroeder et al. |
| 5,918,921 A | 7/1999 | Samuelson |
| D415,663 S | 10/1999 | Whitehead et al. |
| 5,970,692 A | 10/1999 | Foster |
| 6,050,576 A | 4/2000 | Tanner et al. |
| 6,053,548 A | 4/2000 | Bowles, Jr. |
| 6,139,040 A | 10/2000 | Dempsey |
| 6,163,986 A | 12/2000 | Townsend |
| 6,237,975 B1 | 5/2001 | Drobot |
| 6,334,640 B1 | 1/2002 | Werner et al. |
| 6,364,424 B1 | 4/2002 | Lashlee et al. |
| D459,641 S | 7/2002 | Guneysu |
| 6,415,588 B1 | 7/2002 | Kao |
| 6,457,757 B2 | 10/2002 | Hendrick |
| 6,474,007 B1 | 11/2002 | Wueshige et al. |
| 6,523,839 B2 | 2/2003 | Simmons et al. |
| 6,643,958 B1 | 11/2003 | Krejci |
| 6,675,507 B2 | 1/2004 | Petruzzelli |
| 6,701,913 B1 | 3/2004 | LeDuc et al. |
| 6,735,887 B1 | 5/2004 | Muzzammel |
| 6,922,920 B1 | 8/2005 | Stratz |
| D523,710 S | 6/2006 | Noonan |
| D525,093 S | 7/2006 | Noonan et al. |
| 7,100,313 B2 | 9/2006 | Scherer |
| 7,111,418 B2 | 9/2006 | Noonan |
| D543,807 S | 6/2007 | Noonan et al. |
| D546,144 S | 7/2007 | Noonan et al. |
| D555,565 S | 11/2007 | Noonan et al. |
| 7,305,779 B1 | 12/2007 | Purvis |
| 2005/0160632 A1 | 7/2005 | Williams |
| 2005/0160633 A1 | 7/2005 | Noonan |
| 2006/0265913 A1 | 11/2006 | Noonan et al. |
| 2007/0013198 A1 | 1/2007 | Brazeau |
| 2007/0227048 A1 | 10/2007 | Adinata |

FOREIGN PATENT DOCUMENTS

| | | |
|---|---|---|
| CN | 1699696 | 11/2005 |
| EP | 1 580 322 | 3/2005 |
| FR | 865426 | 5/1941 |
| JP | 2005-273450 | 10/2005 |
| WO | WO 2005/098142 | 10/2005 |
| WO | WO 2007/025183 | 3/2007 |

OTHER PUBLICATIONS

Field Corn Planter, http://etc.usf.edu/clipart/4200/4213/planter_5.htm, Mar. 11, 2005, 2 pages.

European Community Registered Design No. 000729942-0001, May 23, 2007, Europe.

European Community Registered Design No. 000729942-0002, May 23, 2007, Europe.

Two Photographs of Wovel® Wheeled Shovel, Jan. 2005.

US 7,631,443 B2

WHEELED SHOVEL WITH HINGE APPARATUS

CROSS-REFERENCE TO RELATED APPLICATION

This application claims the benefit of U.S. Provisional Application No. 60/991,218 filed Nov. 29, 2007. The disclosure of the above application is incorporated herein by reference.

FIELD

The present disclosure generally relates (but not exclusively) to hinge apparatus, which may be used, for example, to hingedly connect upper and lower frame members of a device or tool, such as a manually-operated wheeled shovel.

BACKGROUND

The statements in this background section merely provide background information related to the present disclosure and may not constitute prior art.

Numerous manual wheeled vehicles have been in use to assist in transporting materials from one place to another. The age old wheelbarrow is, of course, well known but doesn't employ leverage. Aside from transporting alone, however, loading onto and unloading of materials from a vehicle easily and with reduced stress and strain to the human body have required different approaches. This has been true for shoveling or plowing snow, including wet and heavy slushy snow.

Generally, there are two common types of snow shovels. One type involves lifting and throwing of the snow, and the other involves pushing of the snow like plowing. In general, snow shovels are typically sold by stores only during select periods of time (e.g., during winter, immediately after a snowfall, etc.) and must be stored. Additionally, a user will typically only use a snow shovel at select times and must store the snow shovel when not in use. Snow shovels, however, are typically irregular in shape and can often be difficult to easily store. And, while some snow shovels may include arrangements for collapsing or folding a portion of their structure or removing a long handle portion, existing structures often require considerable and often irregular storage arrangements.

SUMMARY

According to various aspects of the present disclosure, there are provided various exemplary embodiments of hinge apparatus, which may be used, for example, to hingedly connect upper and lower frame members of a device or tool, such as a manually-operated wheeled shovel. Other aspects relate to wheeled shovels that include hinge apparatus. Further aspects relate to methods of using and/or making wheeled shovels and/or the components thereof.

In one exemplary embodiment of a hinge apparatus, first and second linking members each include a base portion, sidewalls, and flange portions. The flange portions define sets of openings configured to receive a portion of a first connector, for selectively adjusting the angular orientation of the upper frame member relative to the lower frame member in an open, ready-for-use configuration. The linking members include connector openings configured to receive a portion of a second connector. When the first connector is not engaged with any set of openings, the upper frame member is pivotably movable relative to the lower frame member about the second connector to a closed, collapsed configuration in which the upper frame member is alongside the lower frame member.

In another exemplary embodiment, a wheeled shovel generally includes a frame having an upper frame member and a lower frame member. A handle is disposed at an upper end portion of the upper frame member. A shovel blade is disposed at a lower end portion of the lower frame member. A wheel assembly includes a wheel and an axle with an opening configured to receive a portion of an axle connector. A hinge apparatus includes first and second linking members. The first linking member is disposed at a lower end portion of the upper frame member. The second linking member is disposed at an upper end portion of the lower frame member. The first and second linking members include axle connector openings configured to receive a portion of an axle connector, for attaching the wheel assembly when the axle connector is engaged with the opening of the axle and the axle connector openings of the first and second linking members. The first and second linking members include first and second sets of openings configured to receive a portion of a connector, for selective adjustment to the handle height through an angular orientation of the upper frame member to the lower frame member. When the connector is engaged with the first set of openings and the wheeled shovel is in a first open, ready-for-use configuration, the upper frame member is at a first angular orientation relative to the lower frame member and the handle is at a first handle height. When the connector is engaged with the second set of openings and the wheeled shovel is in a second open, ready-for-use configuration, the upper frame member is at a second angular orientation relative to the lower frame member less than the first angular orientation such that the handle is at a second handle height higher than the first handle height. When the connector is not engaged with the first or second set of openings, the upper frame member is pivotably movable relative to the lower frame member about the axle connector to a closed, collapsed configuration in which the upper frame member is alongside the lower frame member and the handle is adjacent the shovel blade.

Another exemplary embodiment provides a hinge apparatus for hingedly connecting upper and lower frame members of a device. In this exemplary embodiment, the hinge apparatus generally includes first and second linking members. Each linking member includes a base portion, spaced-apart sidewalls extending outwardly from the base portion and configured for receiving a portion of the respective upper and lower frame members generally between the spaced-apart sidewalls, and spaced-apart flange portions extending outwardly beyond the base portion in a direction generally opposite the sidewalls. The flange portions define sets of openings configured to receive a portion of a first connector, for selectively adjusting the angular orientation of the upper frame member relative to the lower frame member in an open, ready-for-use configuration. The first and second linking members include connector openings configured to receive a portion of a second connector. When the first connector is not engaged with any of the sets of openings, the upper frame member is pivotably movable relative to the lower frame member, about the second connector engaged with the connector openings to a closed, collapsed configuration in which the upper frame member is alongside the lower frame member.

Another exemplary embodiment includes a hinge apparatus for hingedly connecting upper and lower frame members of a wheeled device. The wheeled device may include a wheel assembly having a wheel and an axle with an opening configured to receive a portion of an axle connector and a handle disposed at an upper end portion of the upper frame member. In this exemplary embodiment, the hinge apparatus includes first and second linking members. Each linking member includes a base portion, spaced-apart sidewalls extending outwardly from the base portion and configured for receiving a portion of the respective upper and lower frame members generally between the spaced-apart sidewalls, and spaced-apart flange portions extending outwardly beyond the base portion in a direction generally opposite the sidewalls. The flange portions define sets of openings configured to receive a portion of a connector, for selectively adjusting the angular orientation of the upper frame member relative to the lower frame member and the handle height for the wheeled device in an open, ready-for-use configuration. The first and second linking members include axle connector openings configured to receive a portion of an axle connector, for attaching the wheel assembly when the axle connector is engaged with the opening of the axle and the axle connector openings of the first and second linking members. When the connector is not engaged with any of the sets of openings, the upper frame member is pivotably movable relative to the lower frame member, about the axle connector engaged with the axle connector openings, to a closed, collapsed configuration in which the upper frame member is alongside the lower frame member and the handle is adjacent a lower portion of the lower frame member.

Other aspects relate to methods of using devices having a hinge apparatus. In one exemplary embodiment, there is provided a method of using a wheeled shovel that includes a frame having upper and lower frame members hingedly connected by a hinge apparatus, a handle disposed at an upper end portion of the upper frame member, a shovel blade disposed at a lower end portion of the lower frame member, a wheel assembly having a wheel and an axle with an opening configured to receive a portion of an axle connector. In this exemplary embodiment, a method generally includes engaging a connector with a first or second set of openings defined by first and second linking members of the hinge apparatus, to thereby select a respective first or second handle height for the wheeled shovel in an open, ready-for-use configuration with the upper frame member at a respective first or second angular orientation relative to the lower frame member, the second angular orientation being less than the first angular orientation such that the second handle height is higher than the first handle height.

Further aspects and features of the present disclosure will become apparent from the detailed description provided hereinafter. In addition, any one or more aspects of the present disclosure may be implemented individually or in any combination with any one or more of the other aspects of the present disclosure. It should be understood that the detailed description and specific examples, while indicating exemplary embodiments of the present disclosure, are intended for purposes of illustration only and are not intended to limit the scope of the present disclosure.

DRAWINGS

The drawings described herein are for illustration purposes only and are not intended to limit the scope of the present disclosure in any way.

Figure 1:
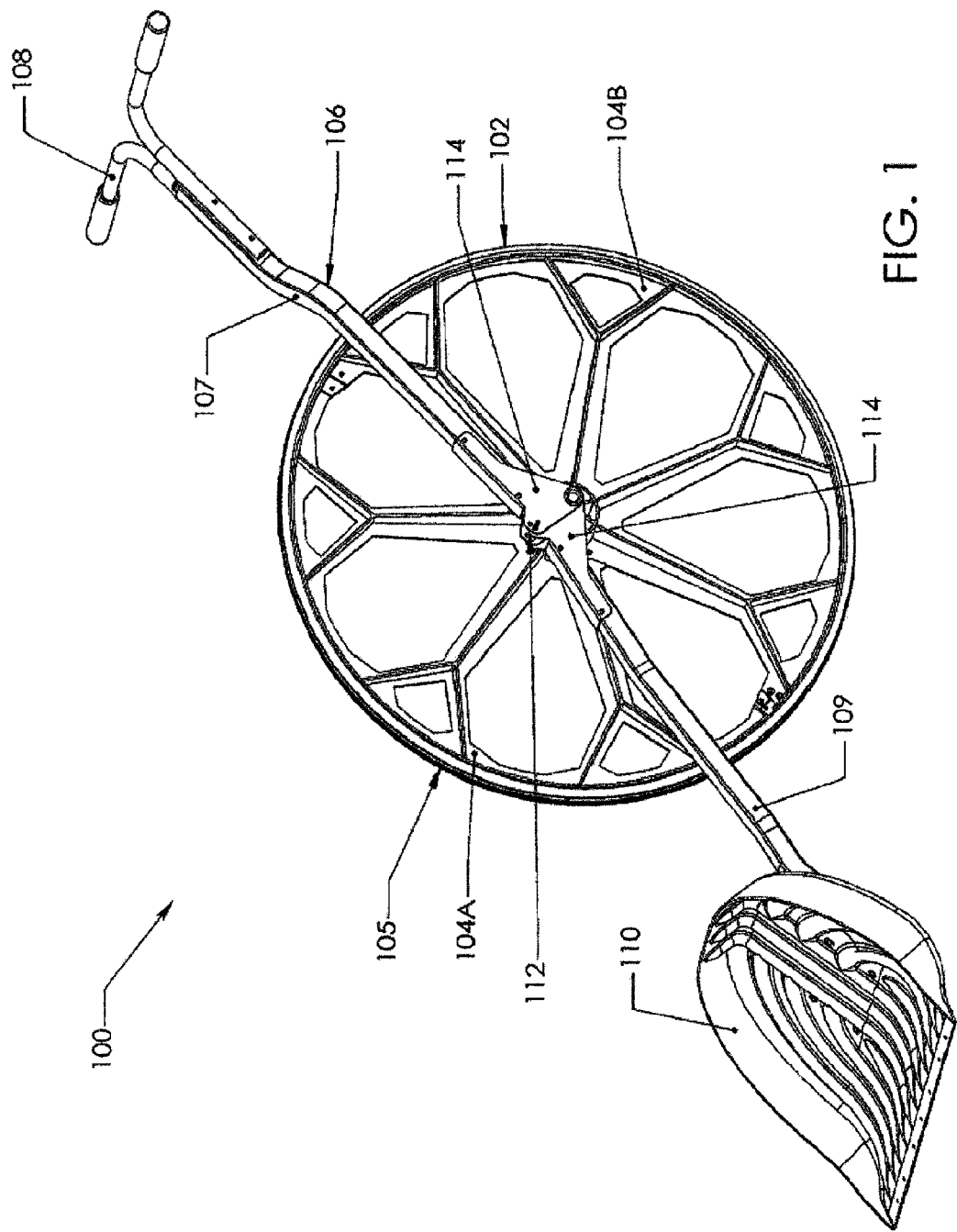
FIG. 1 is a perspective view of a wheeled shovel with a hinge apparatus according to an exemplary embodiment, and illustrating the wheeled shovel in an open, unfolded, or ready-for-use configuration with the hinge apparatus in a first or lowest handle height setting.
Figure 2:
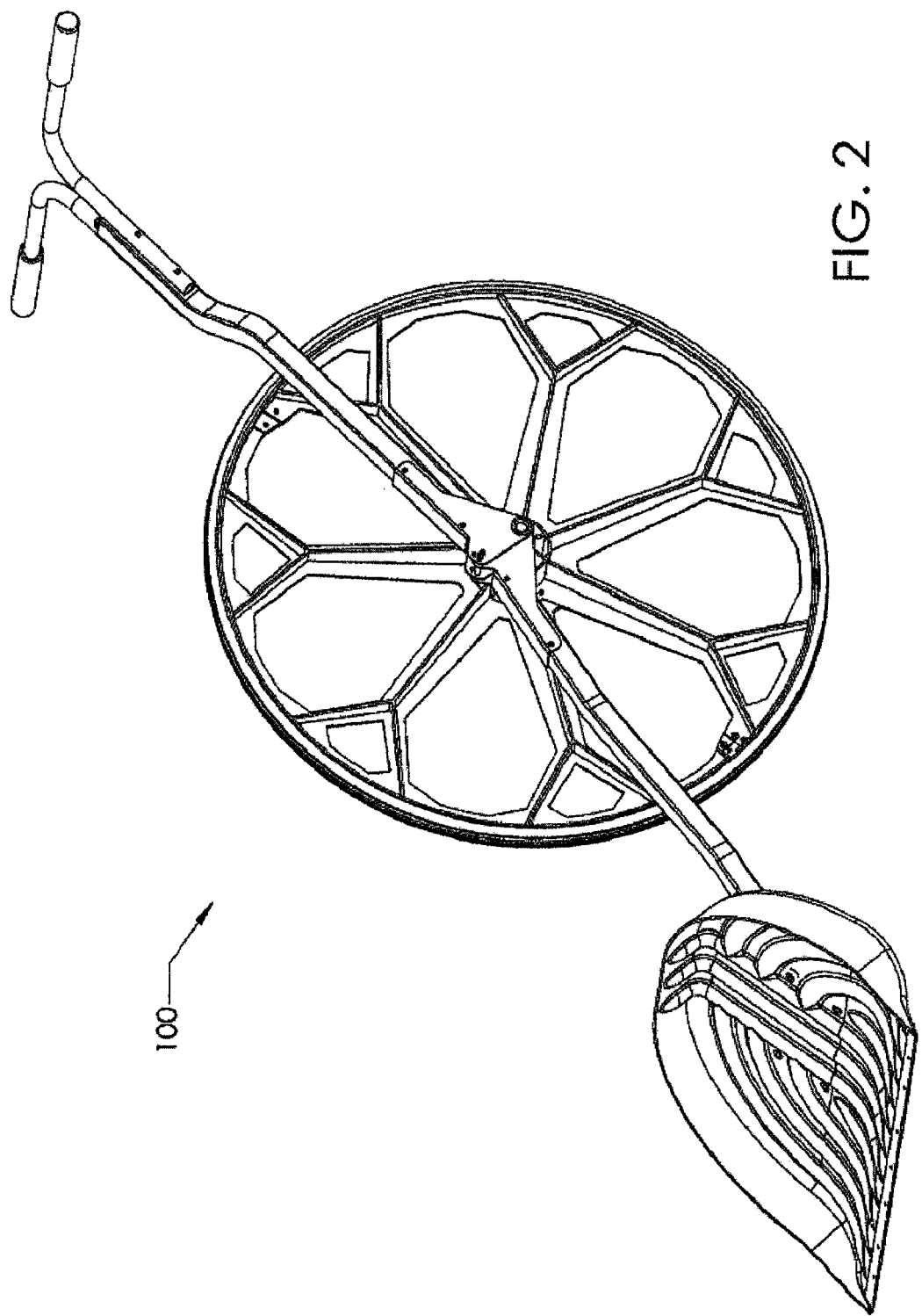
FIG. 2 is a perspective view of the wheeled shovel shown in FIG. 1, and again illustrating the wheeled shovel in an open, unfolded, or ready-for-use configuration but with the hinge apparatus in a second or intermediate handle height setting such that the wheeled shovel's handle height is higher than the handle height when the hinge apparatus is in the first handle height setting shown in FIG. 1.
Figure 3:
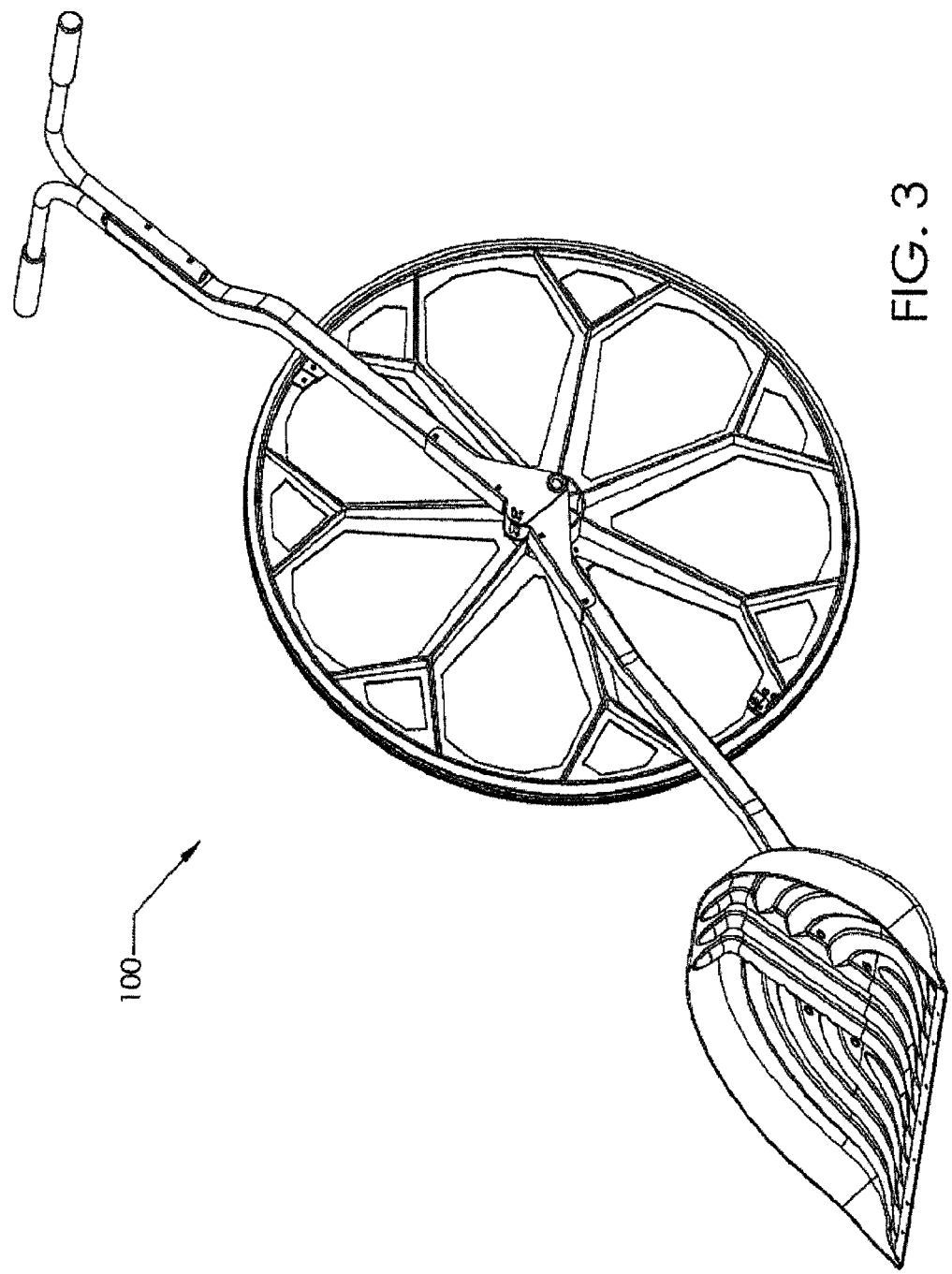
Figure 4:
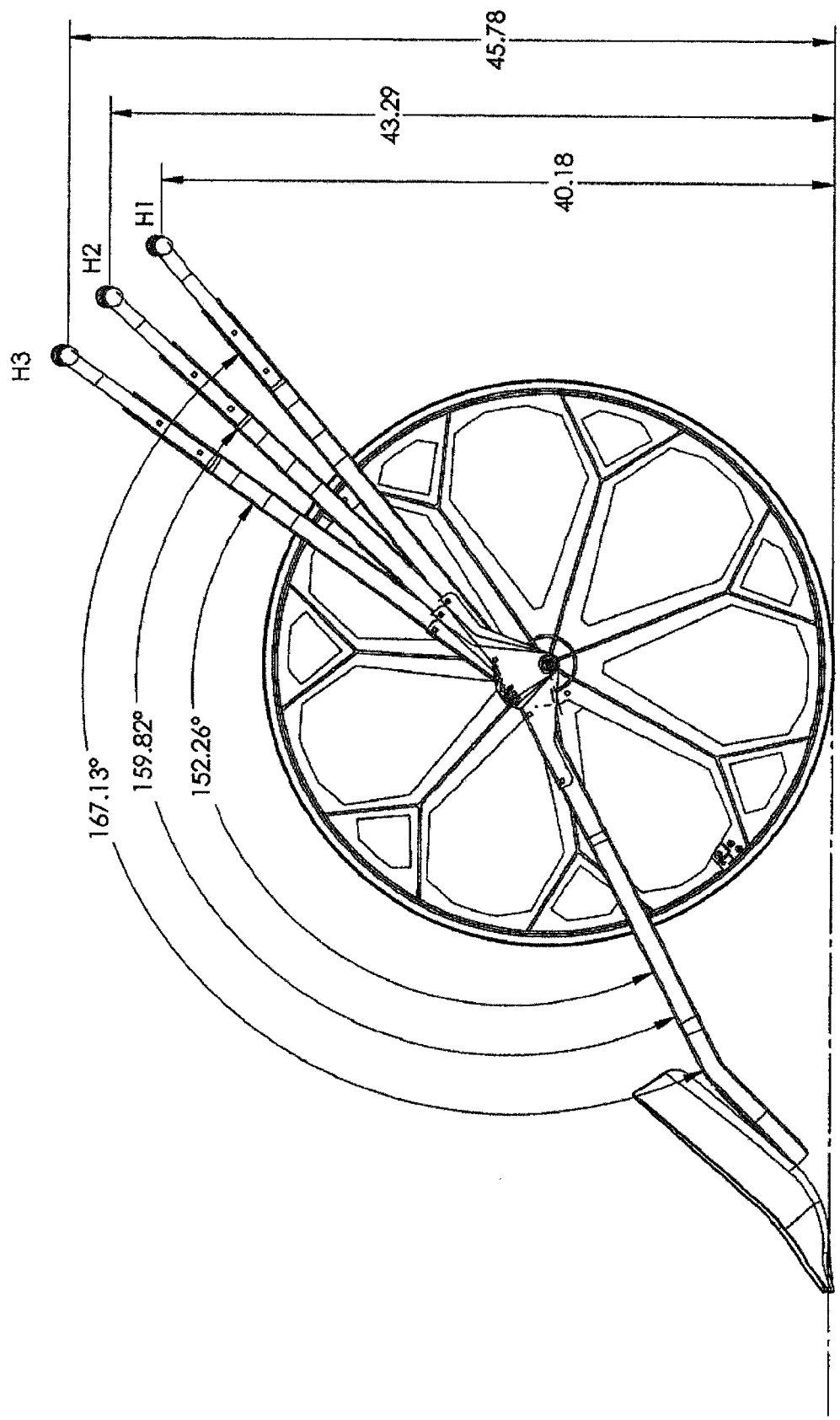
Figure 5:
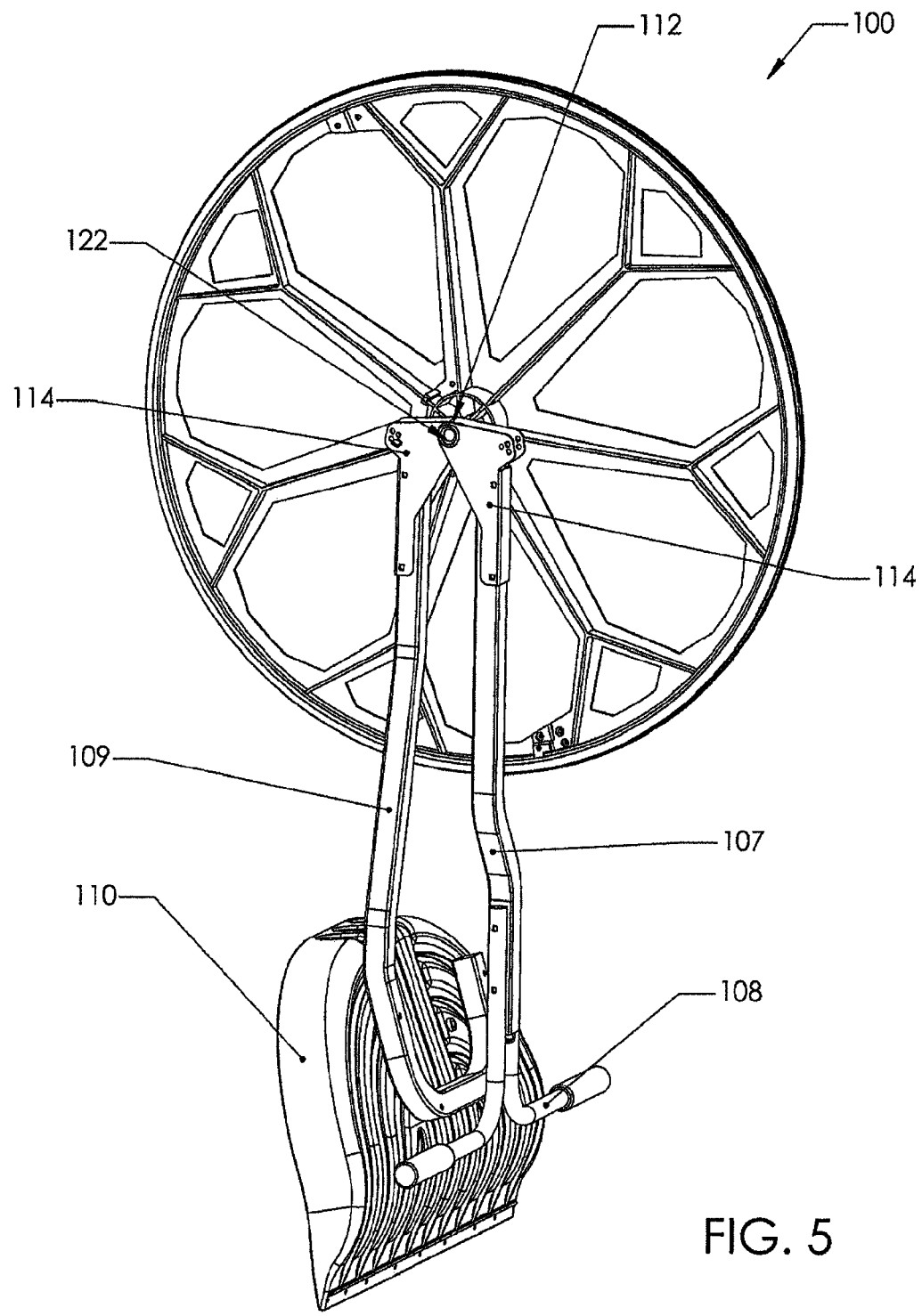
Figure 6:
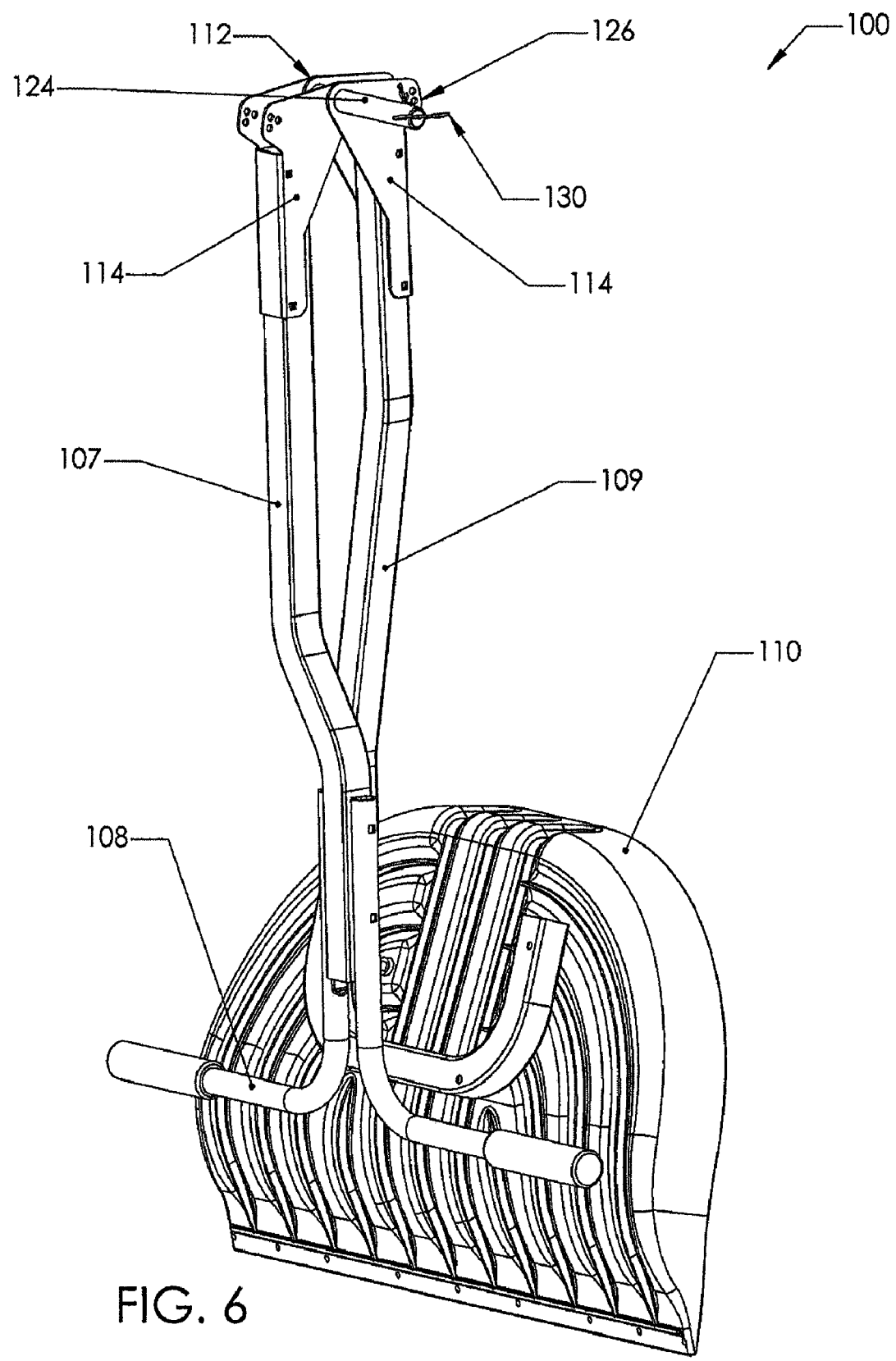
Figure 7:
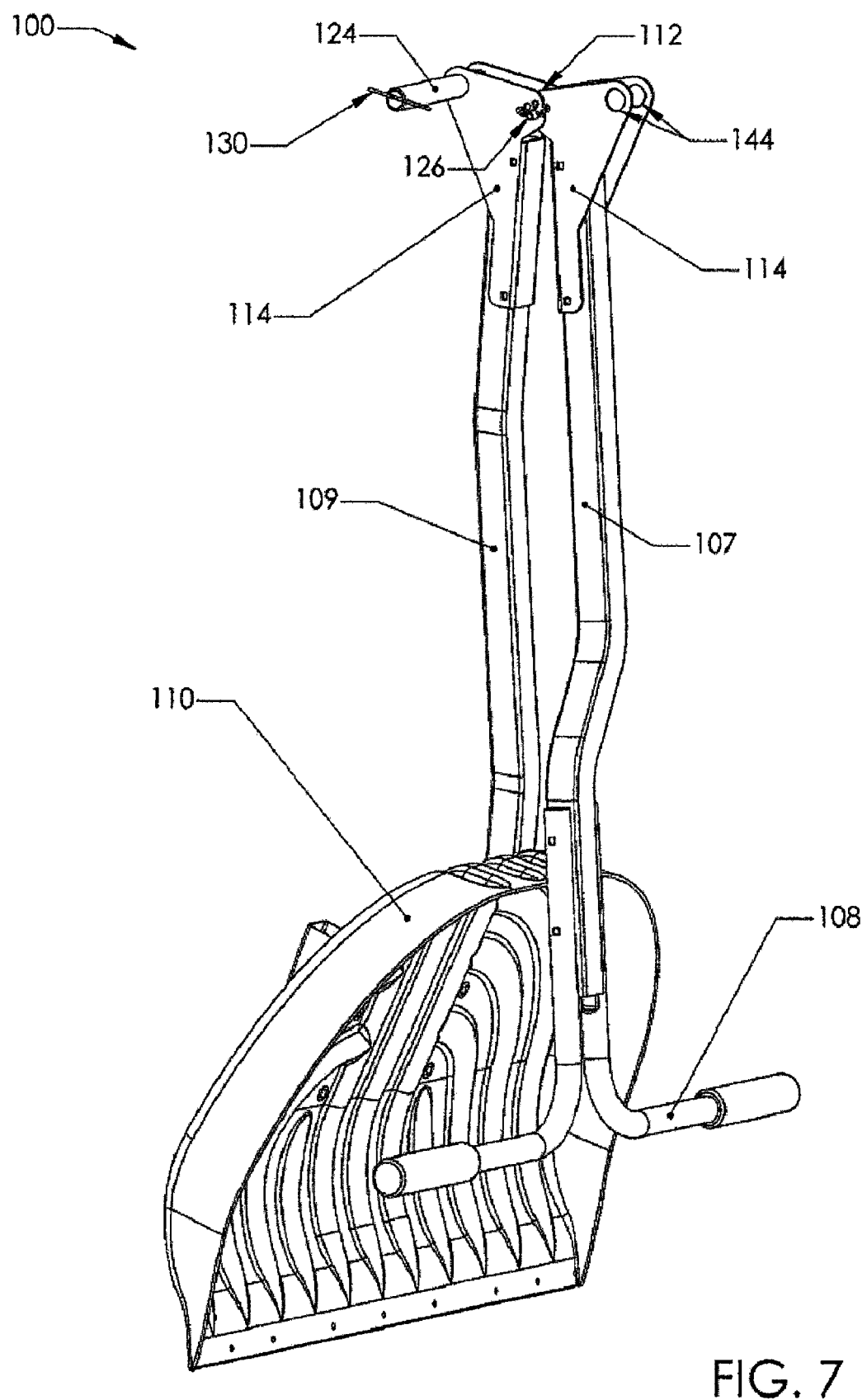
Figure 8:
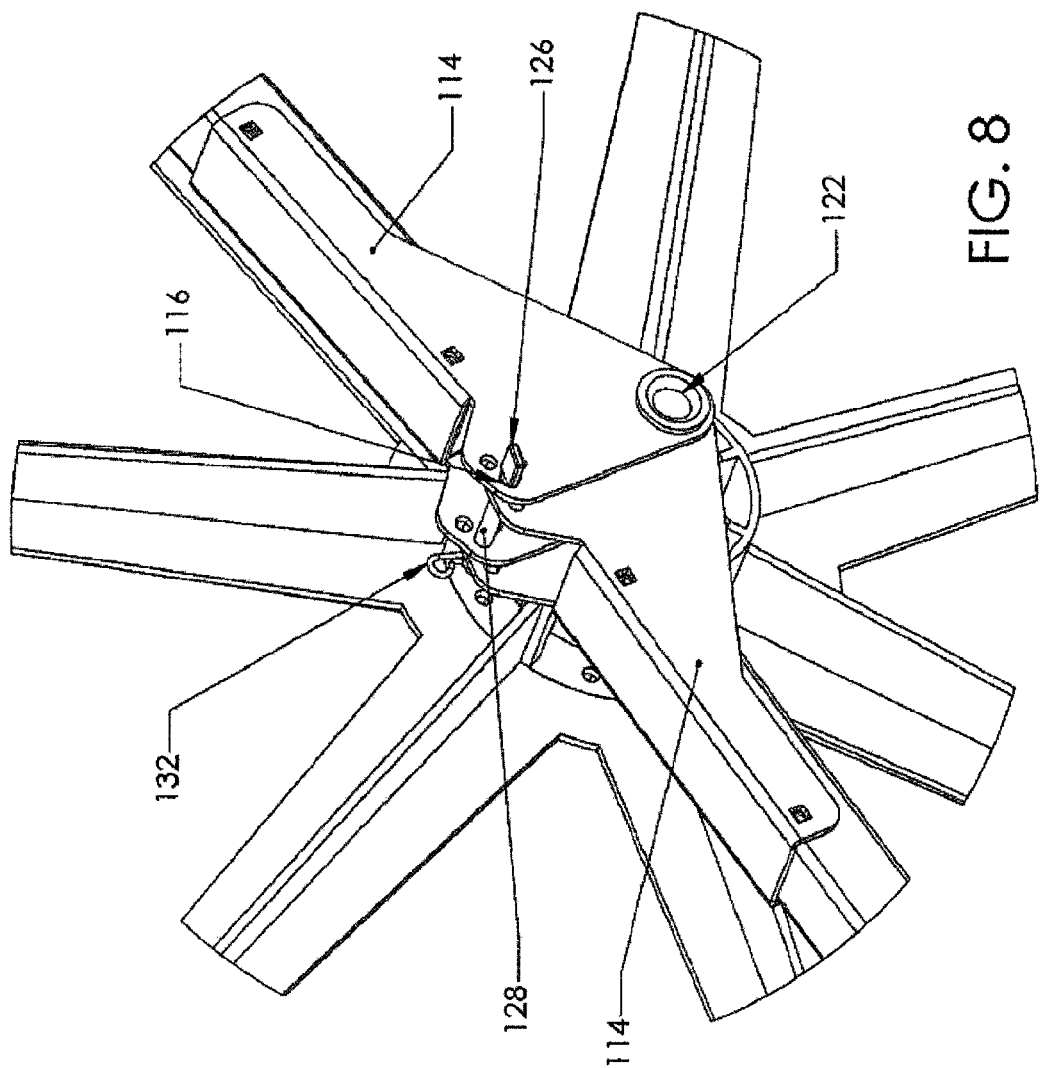
Figure 9:
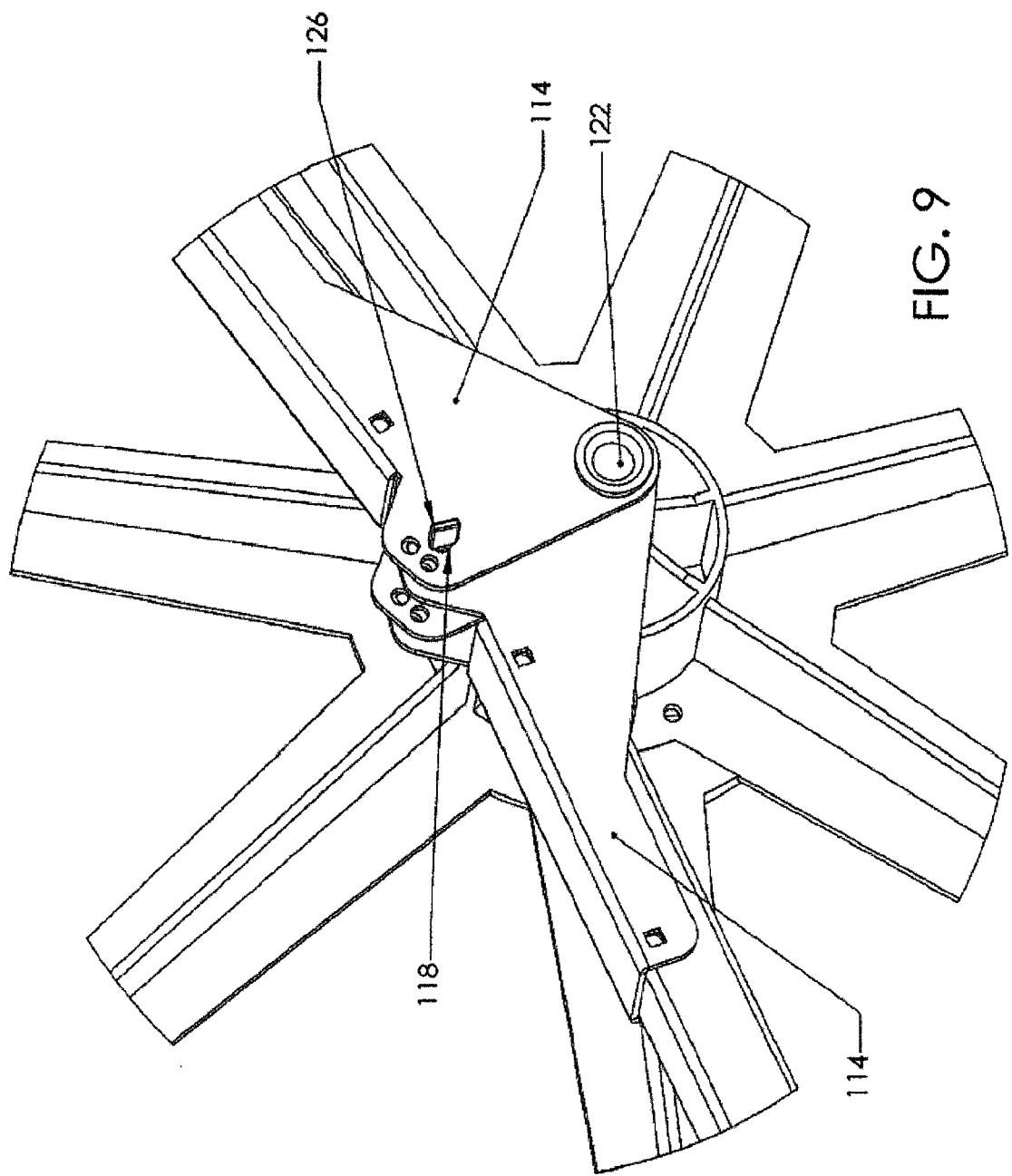
Figure 10:
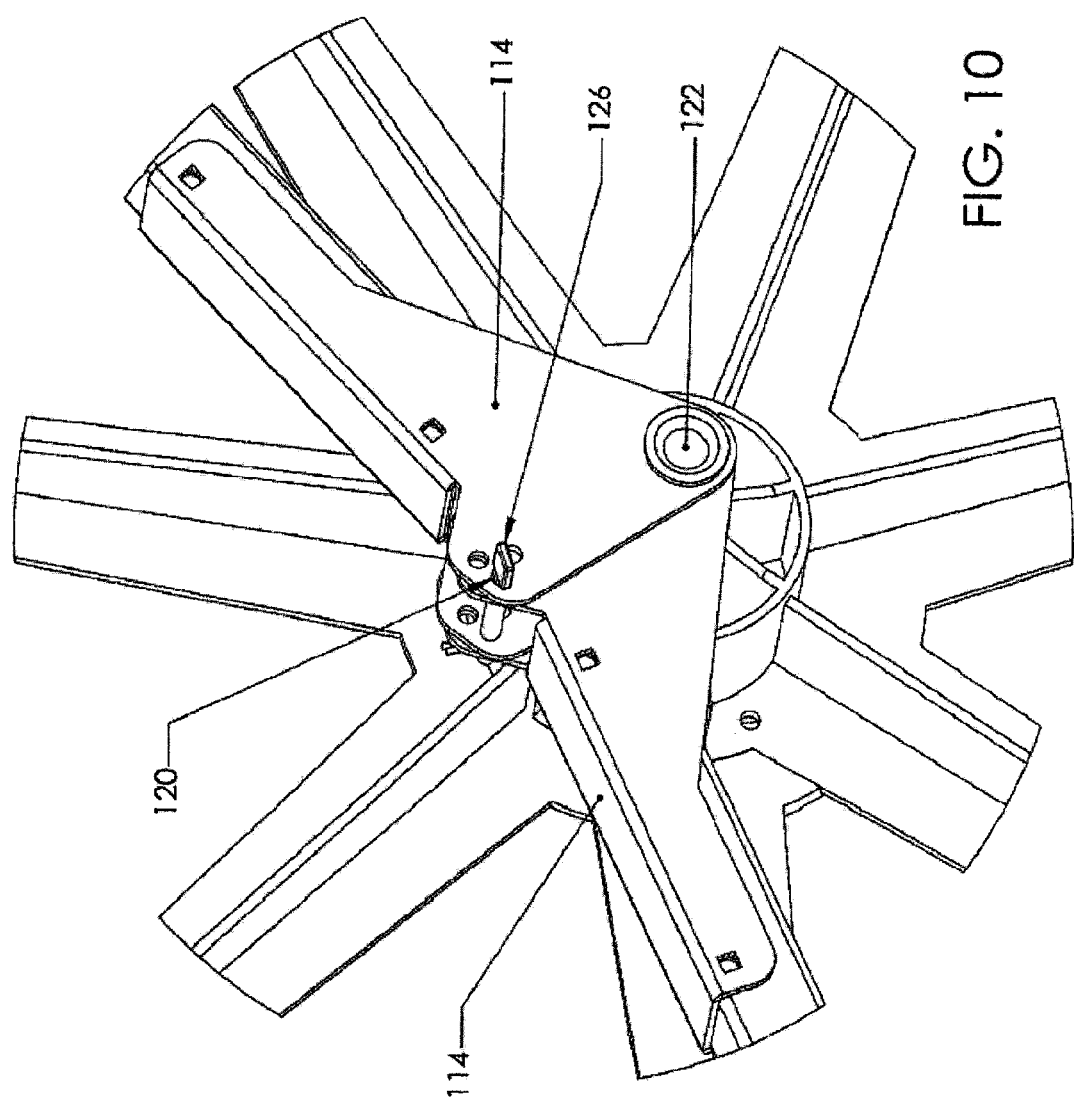
Figure 11:
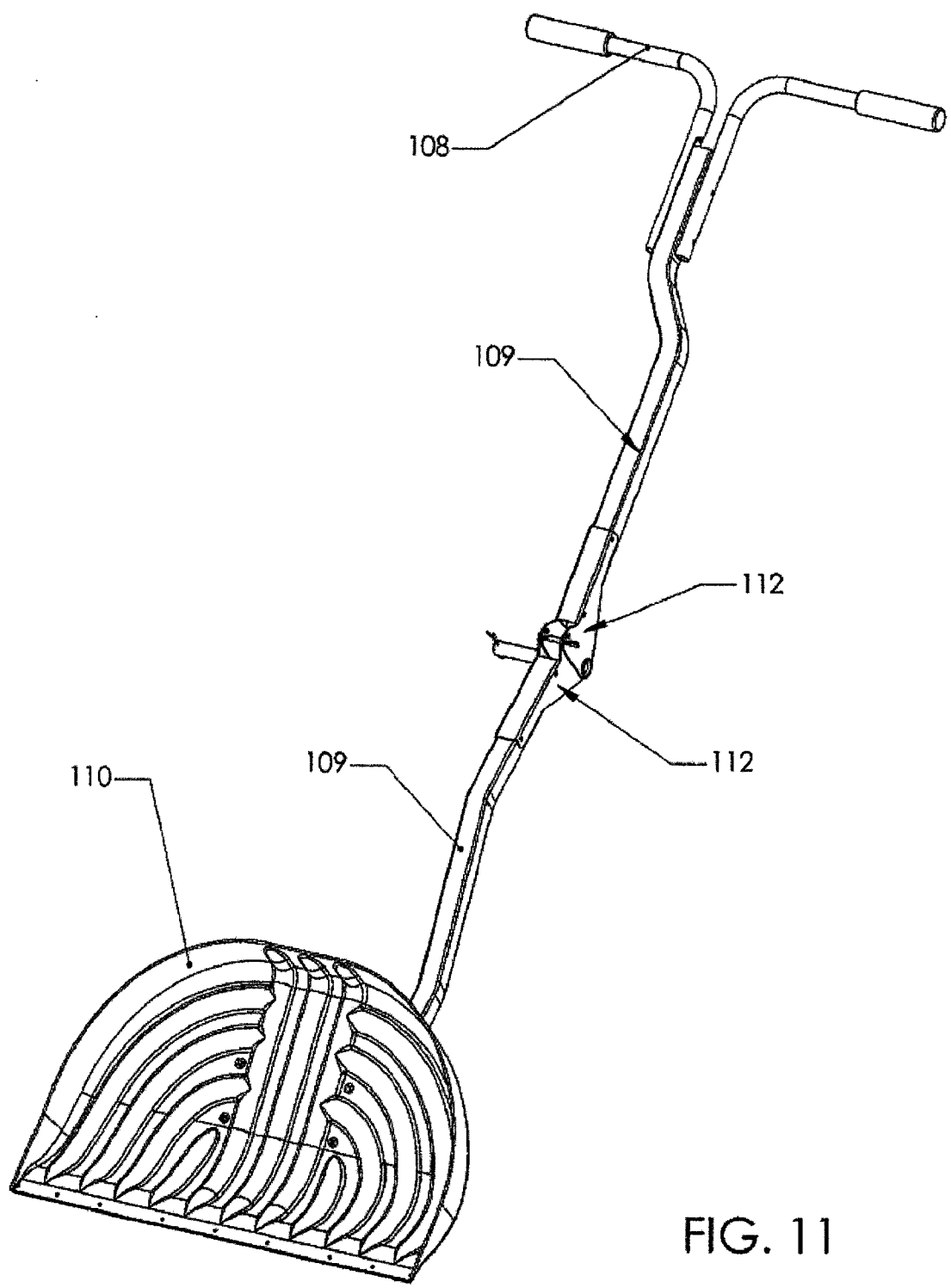
Figure 12:
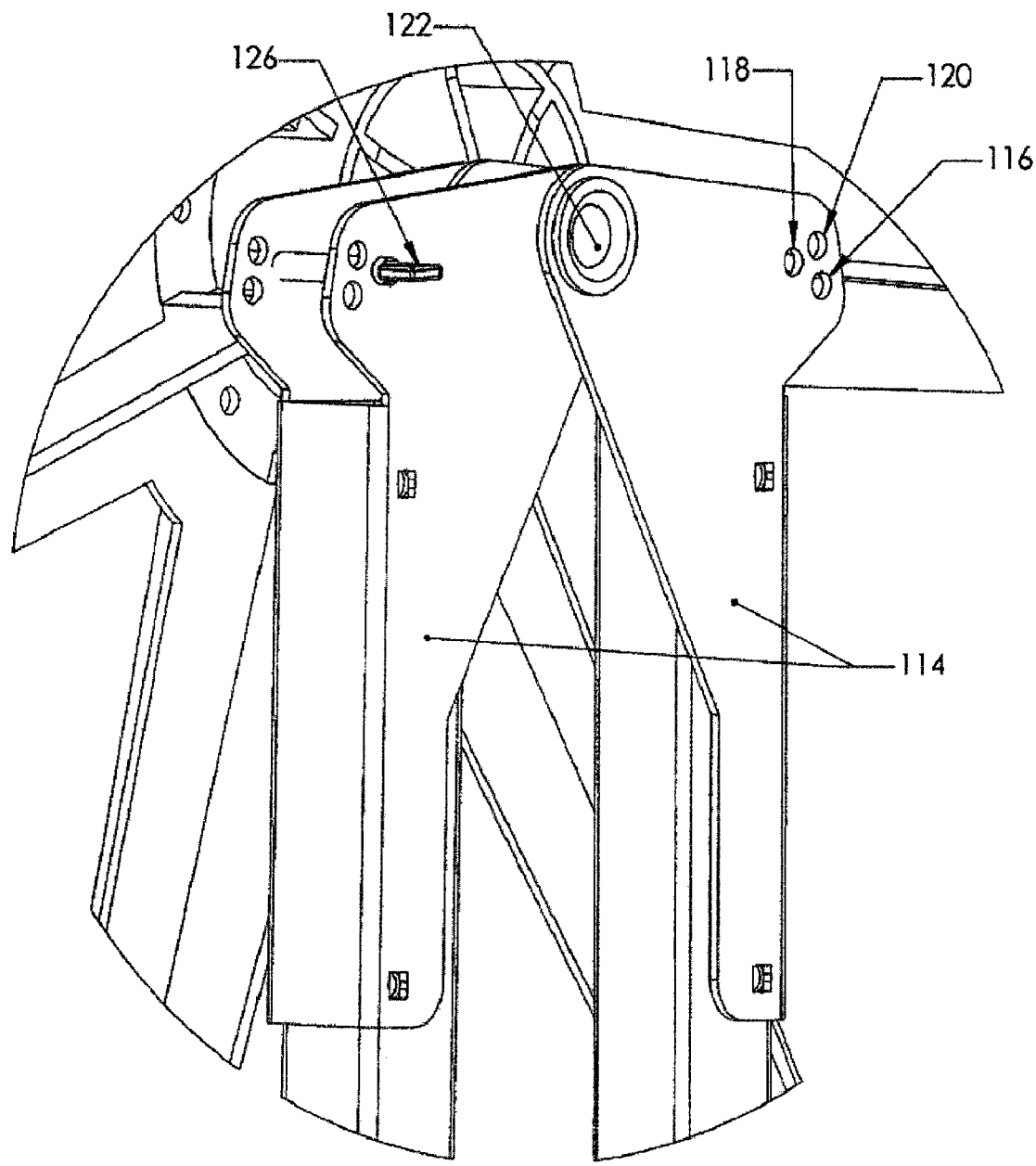
Figure 13:
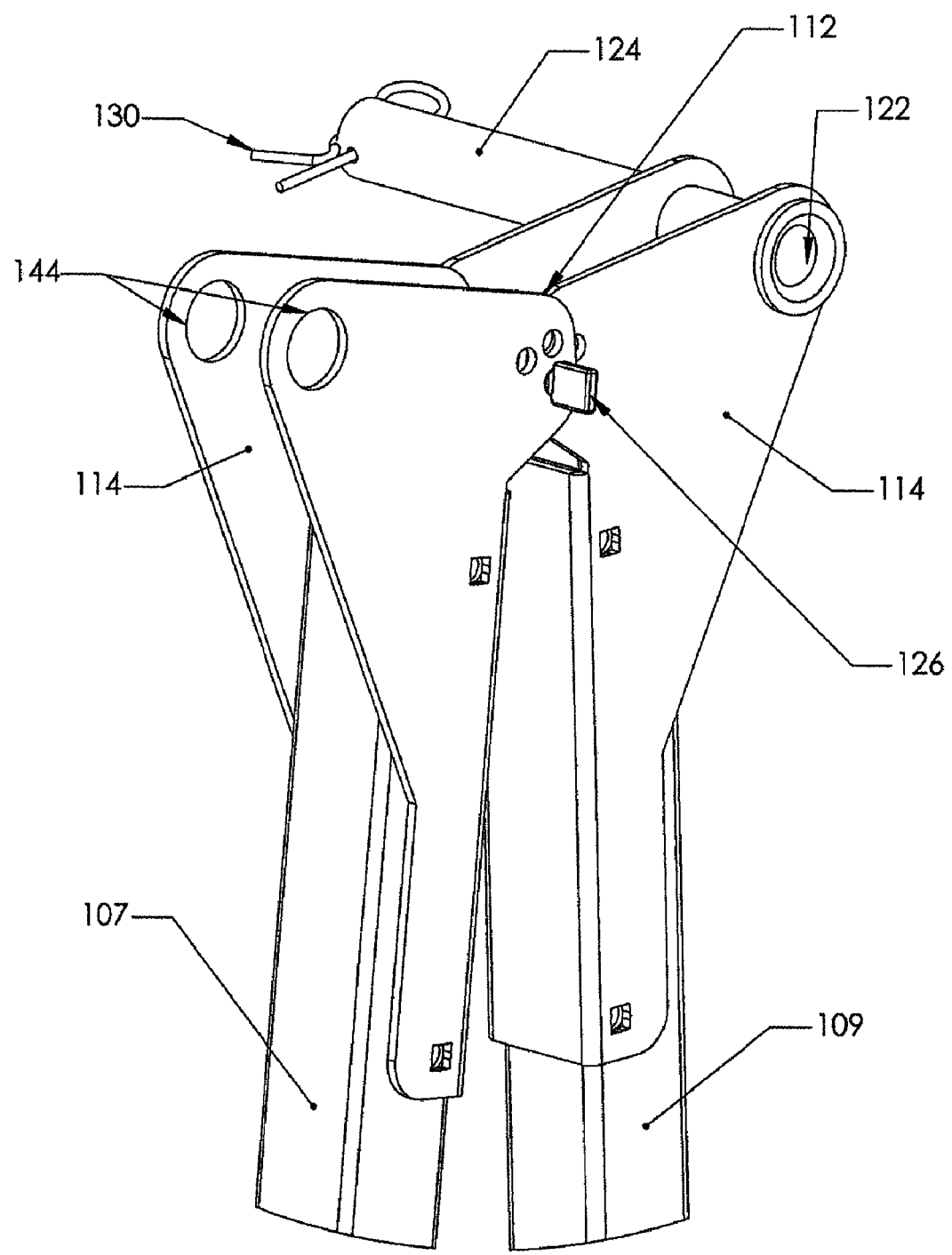
Figure 14:
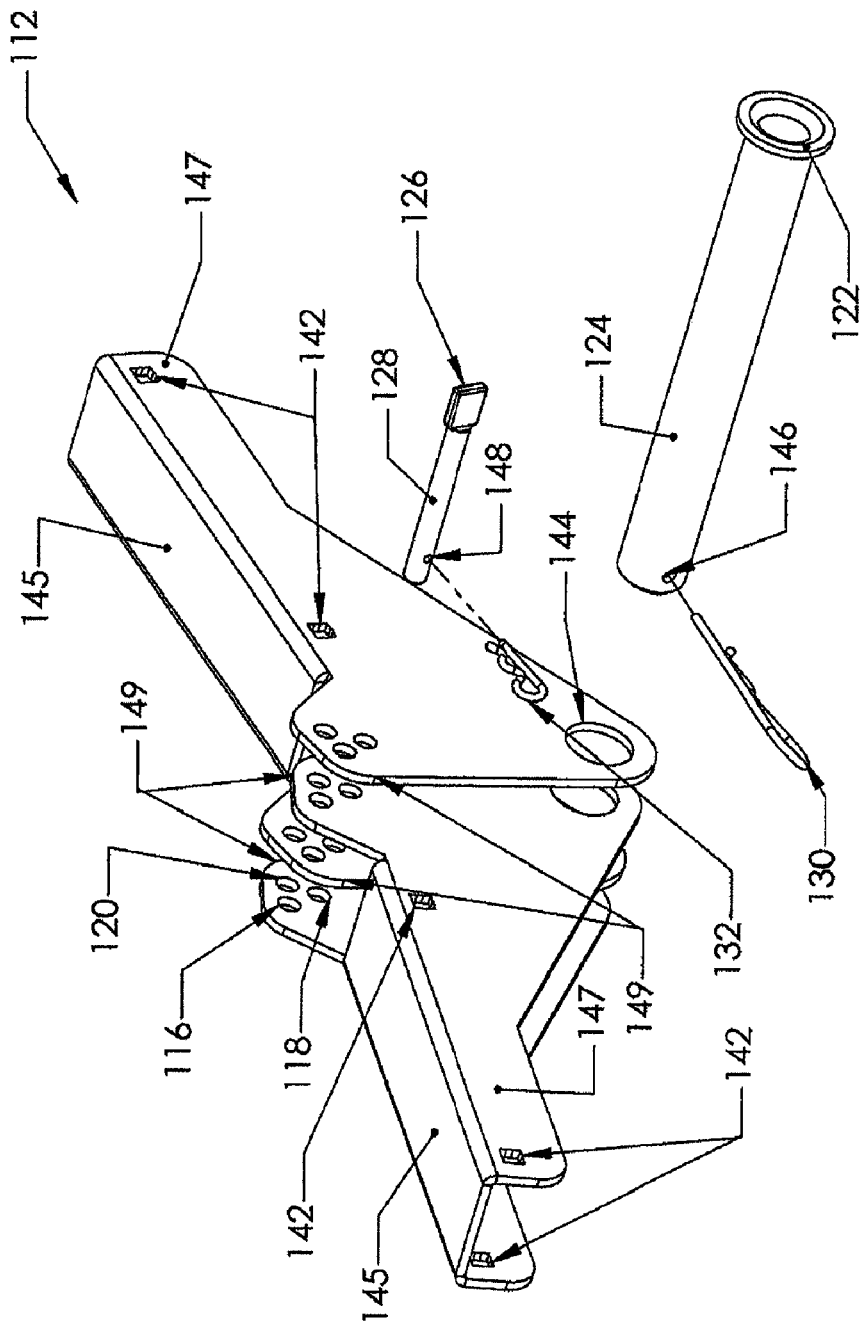
Figure 15:
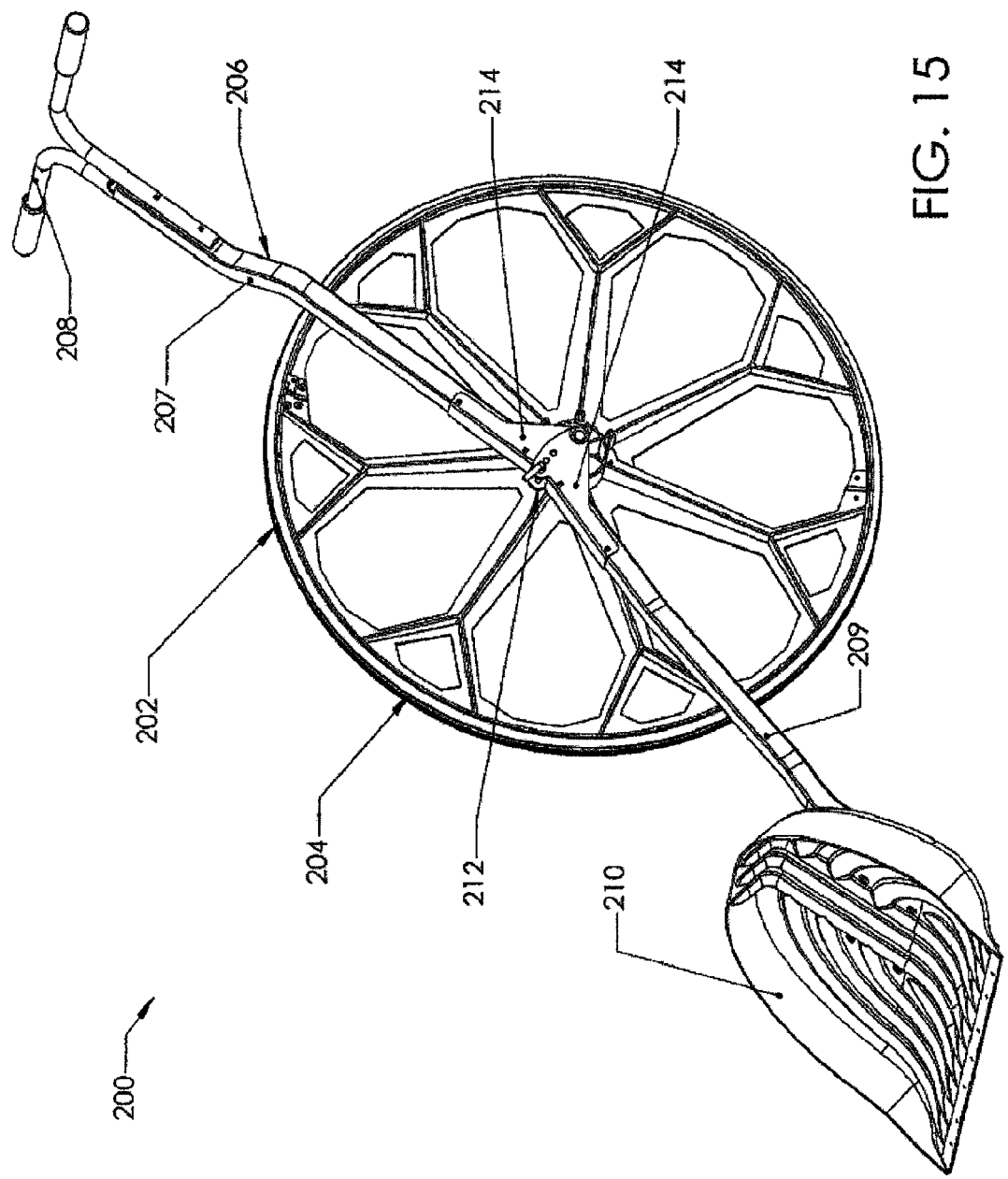
Figure 16:
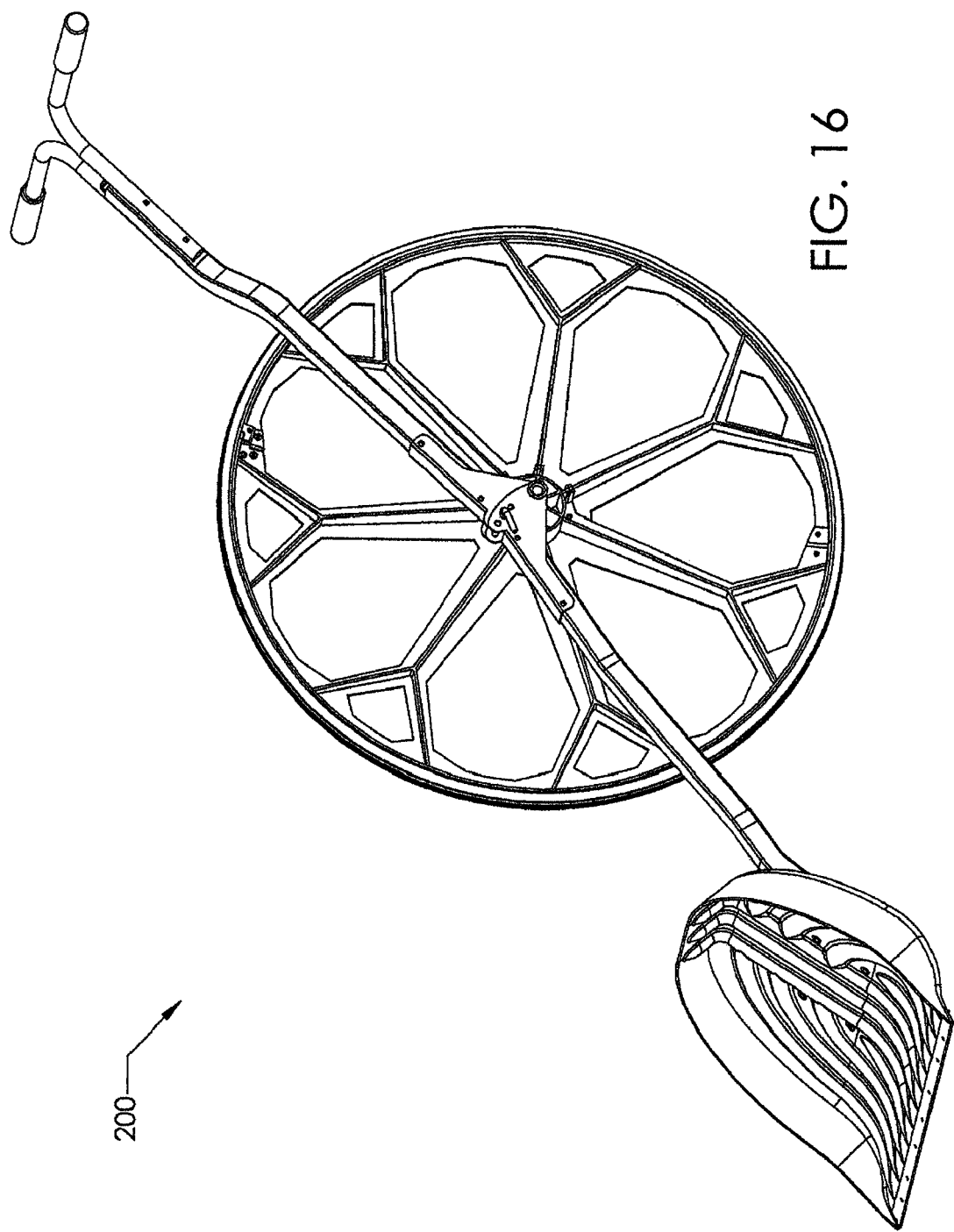
Figure 17:
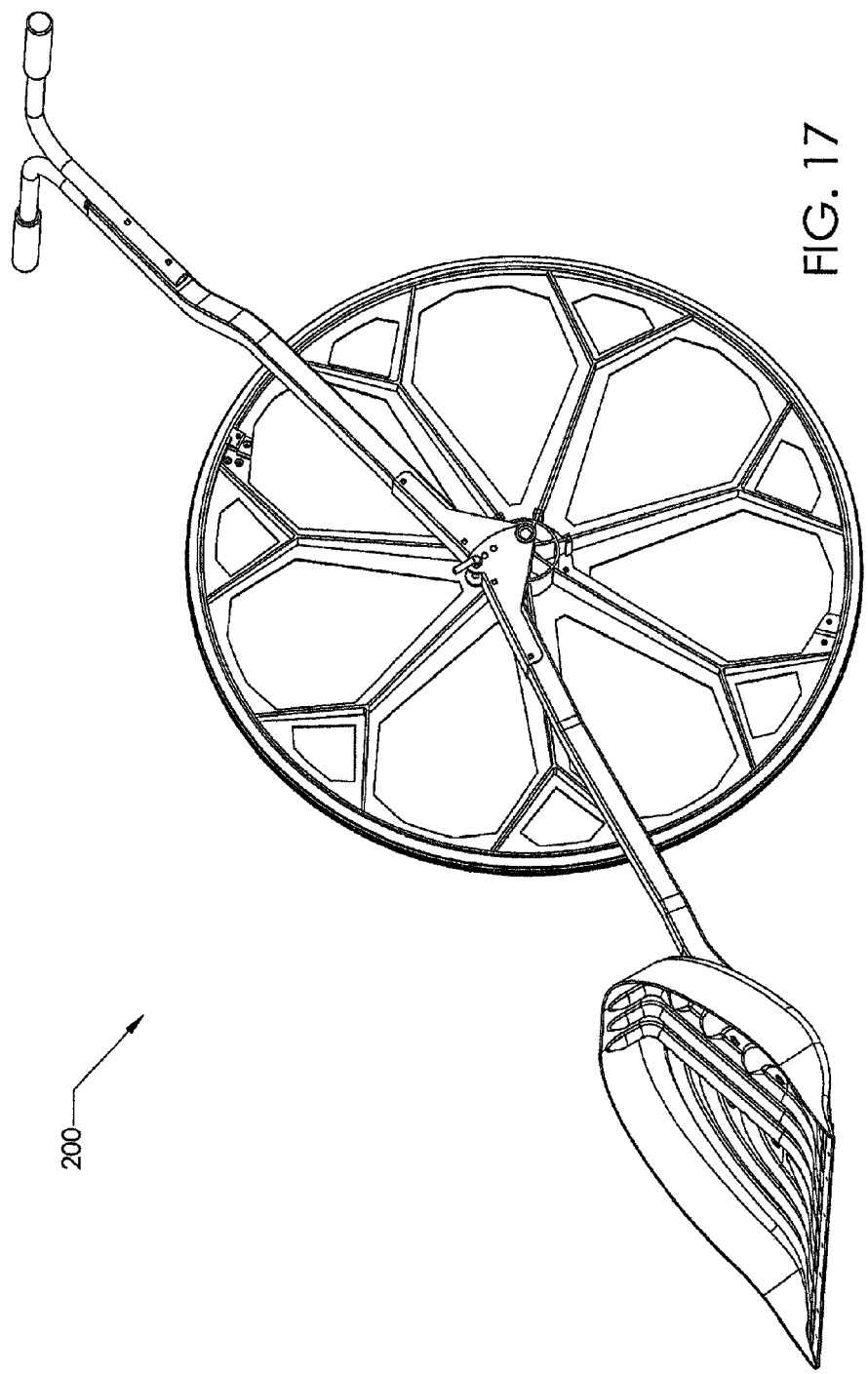
Figure 18:
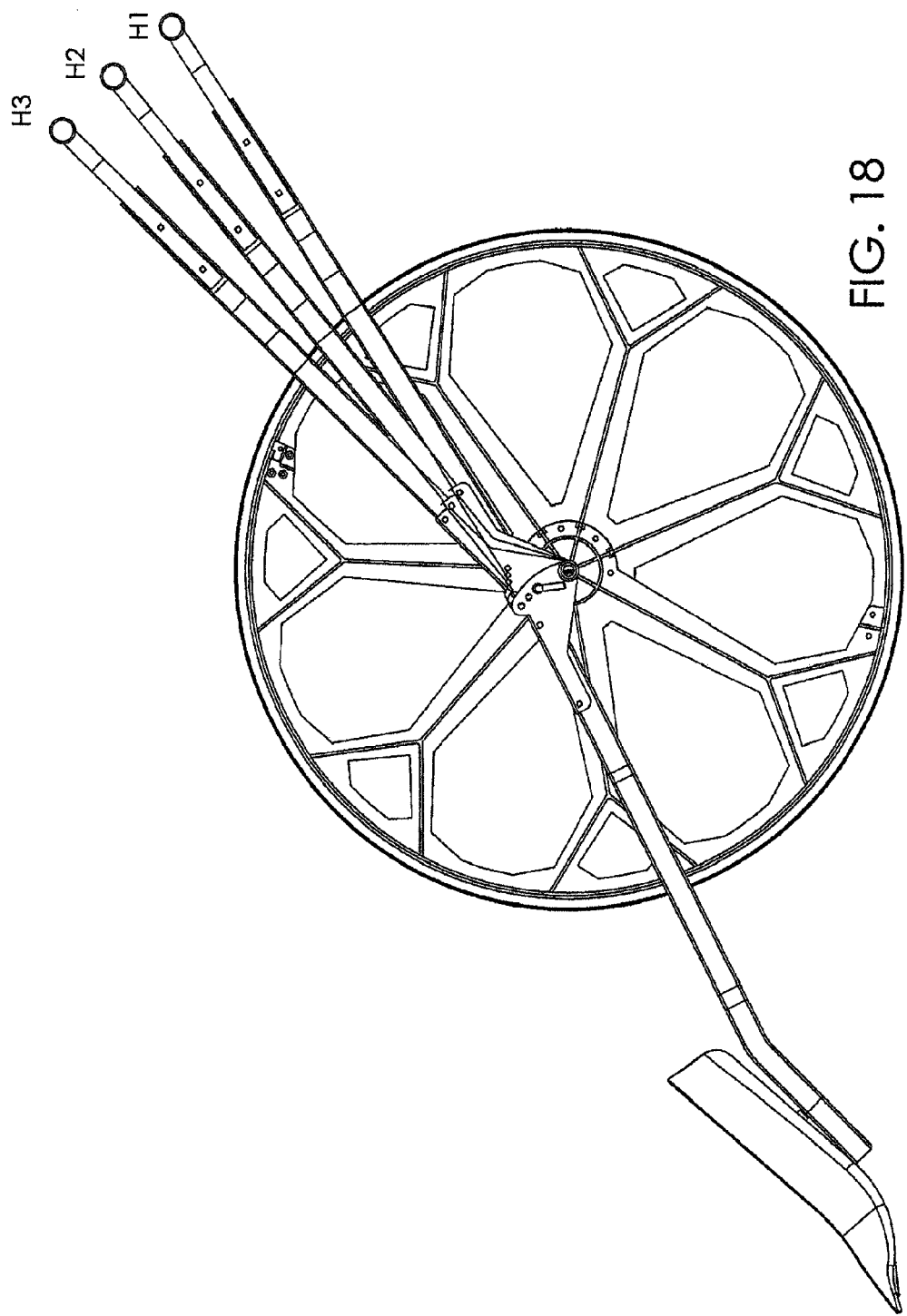
Figure 19:
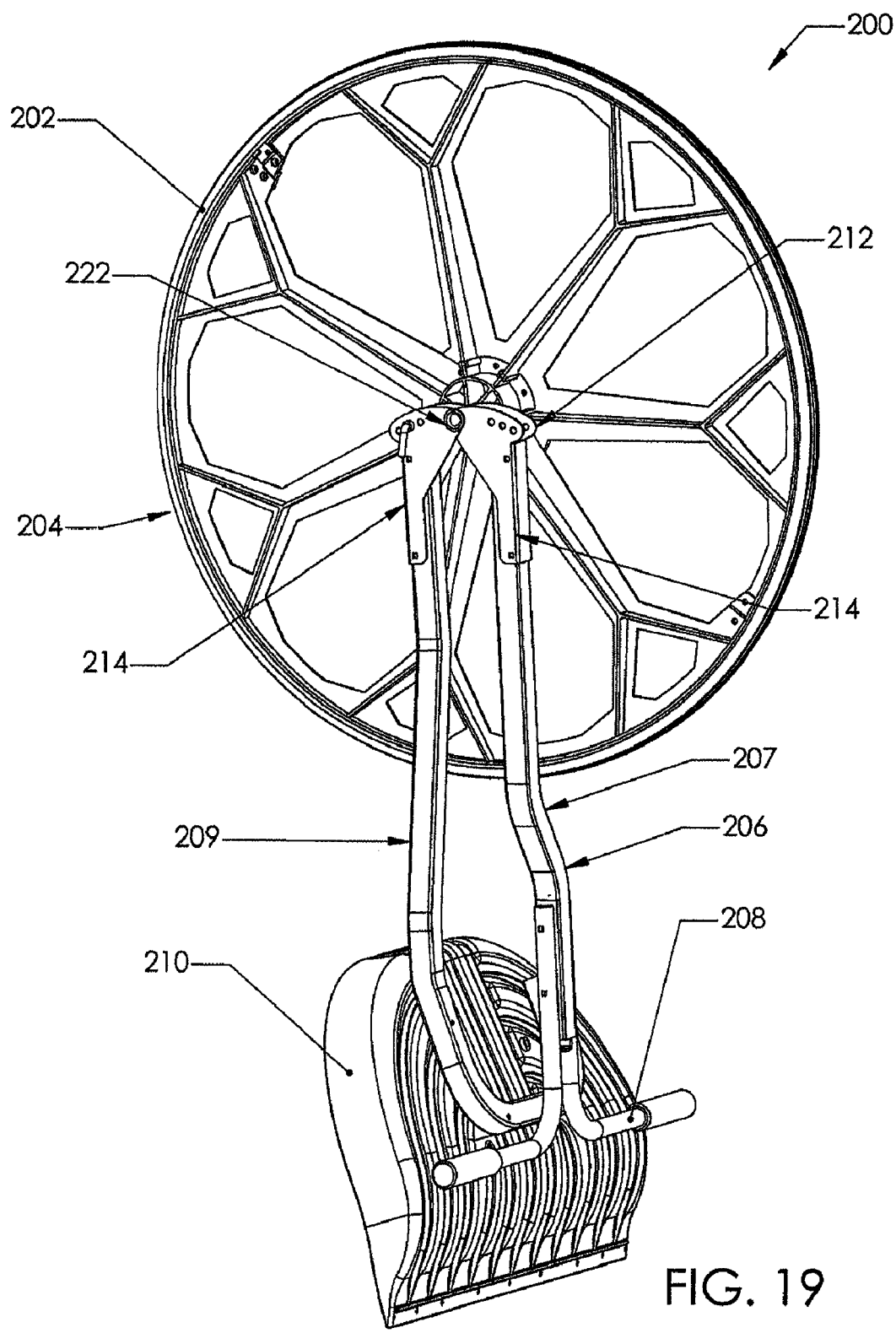
Figure 20:
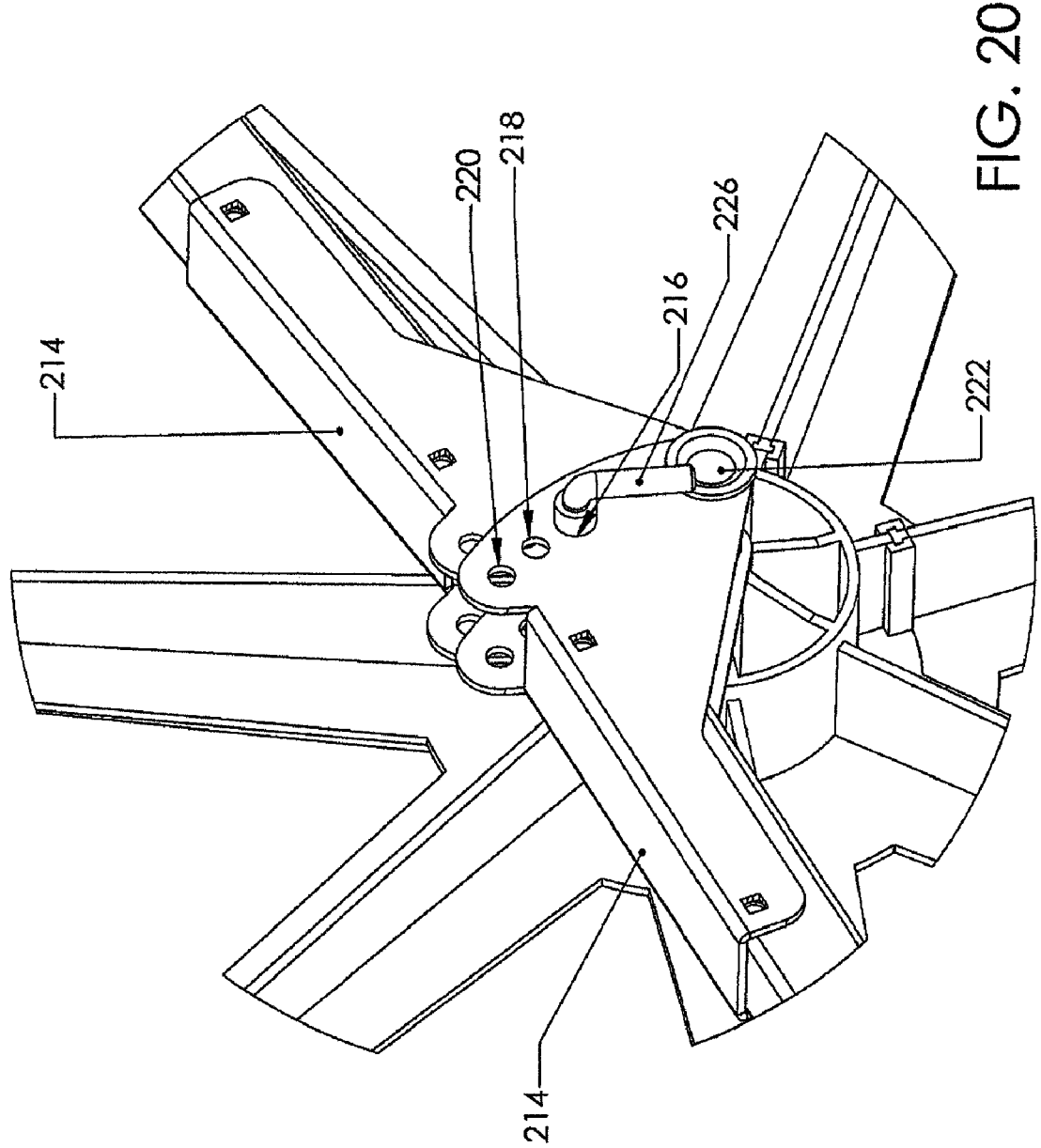
Figure 21:
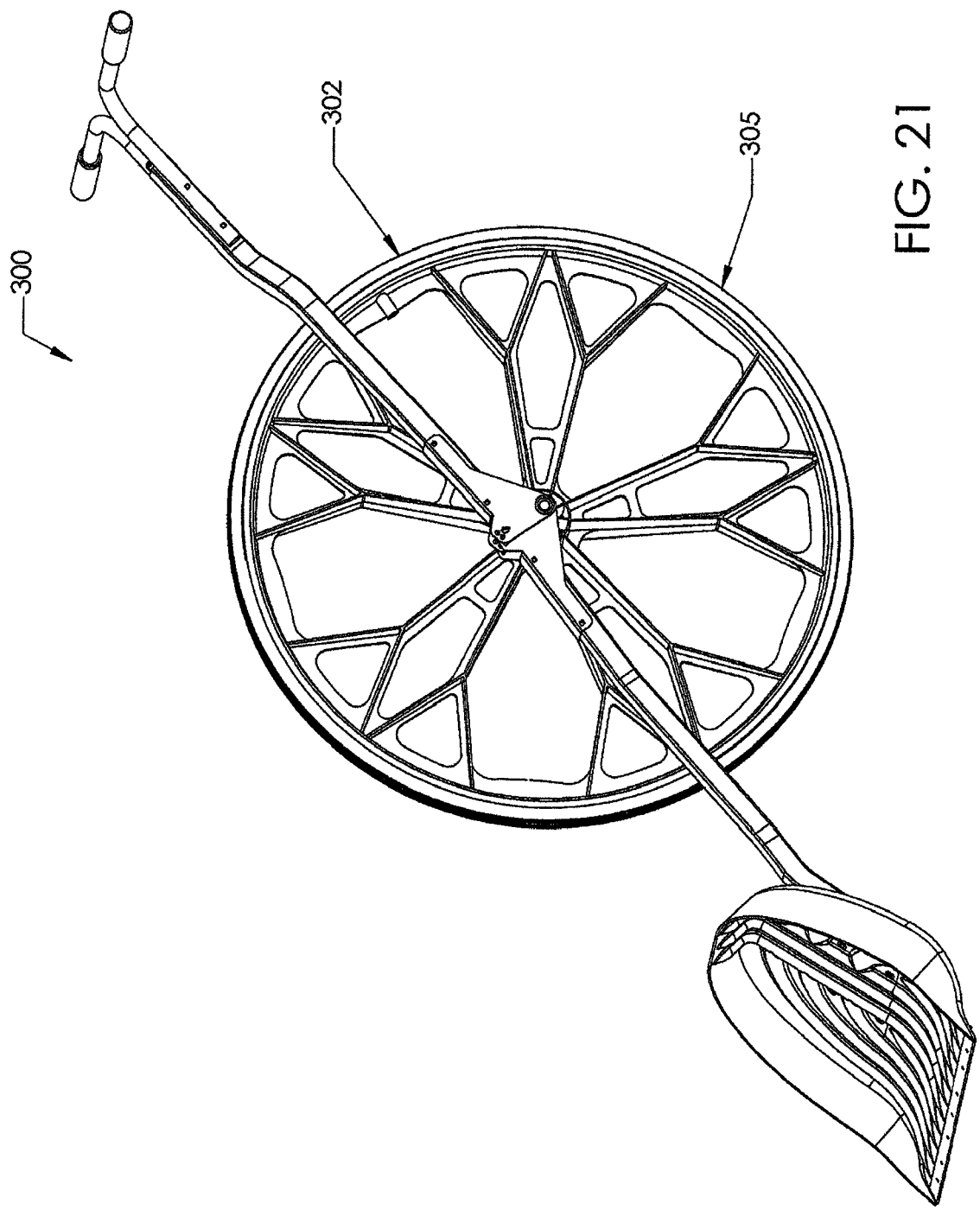
Figure 22:
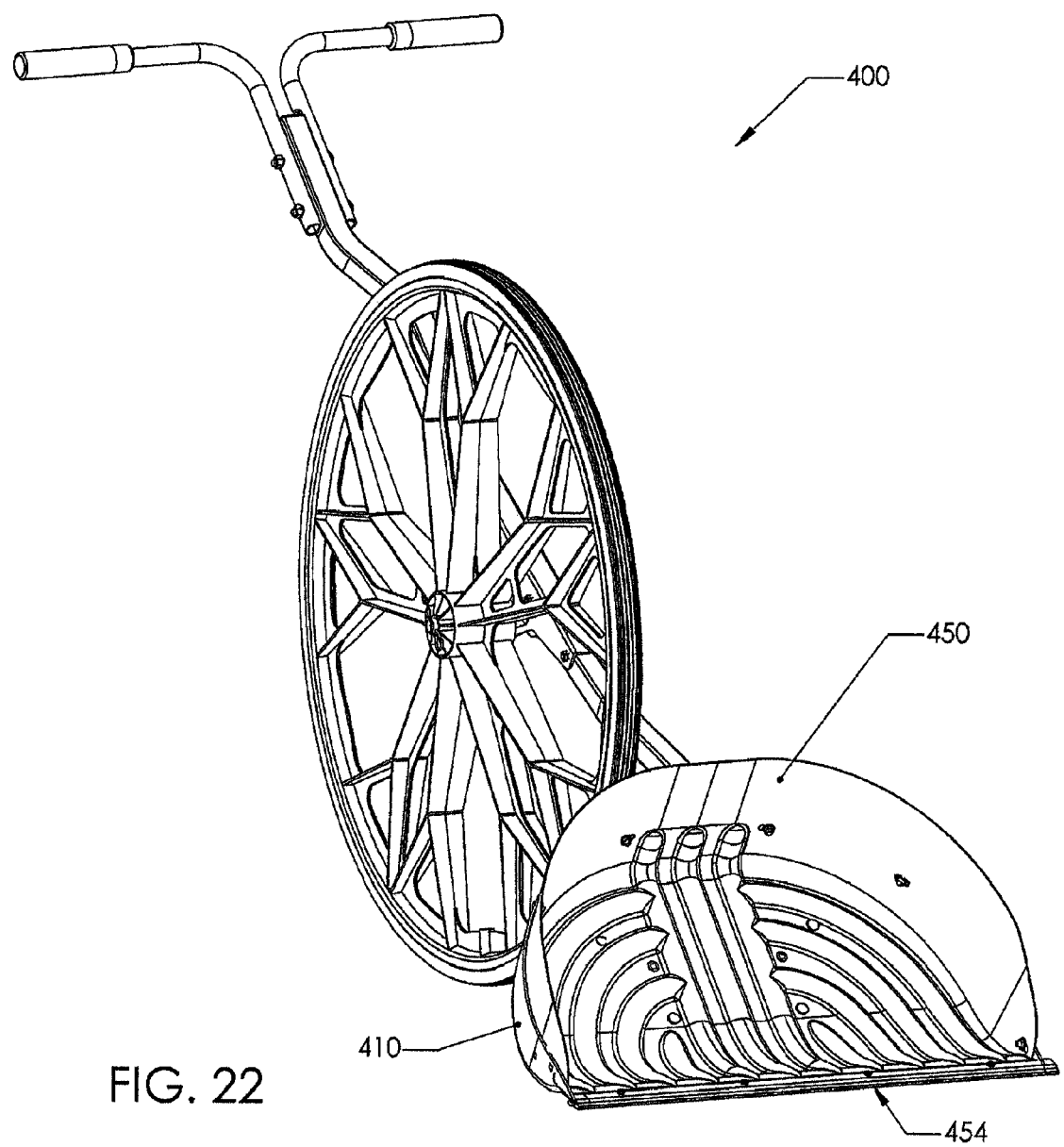
Figure 23:
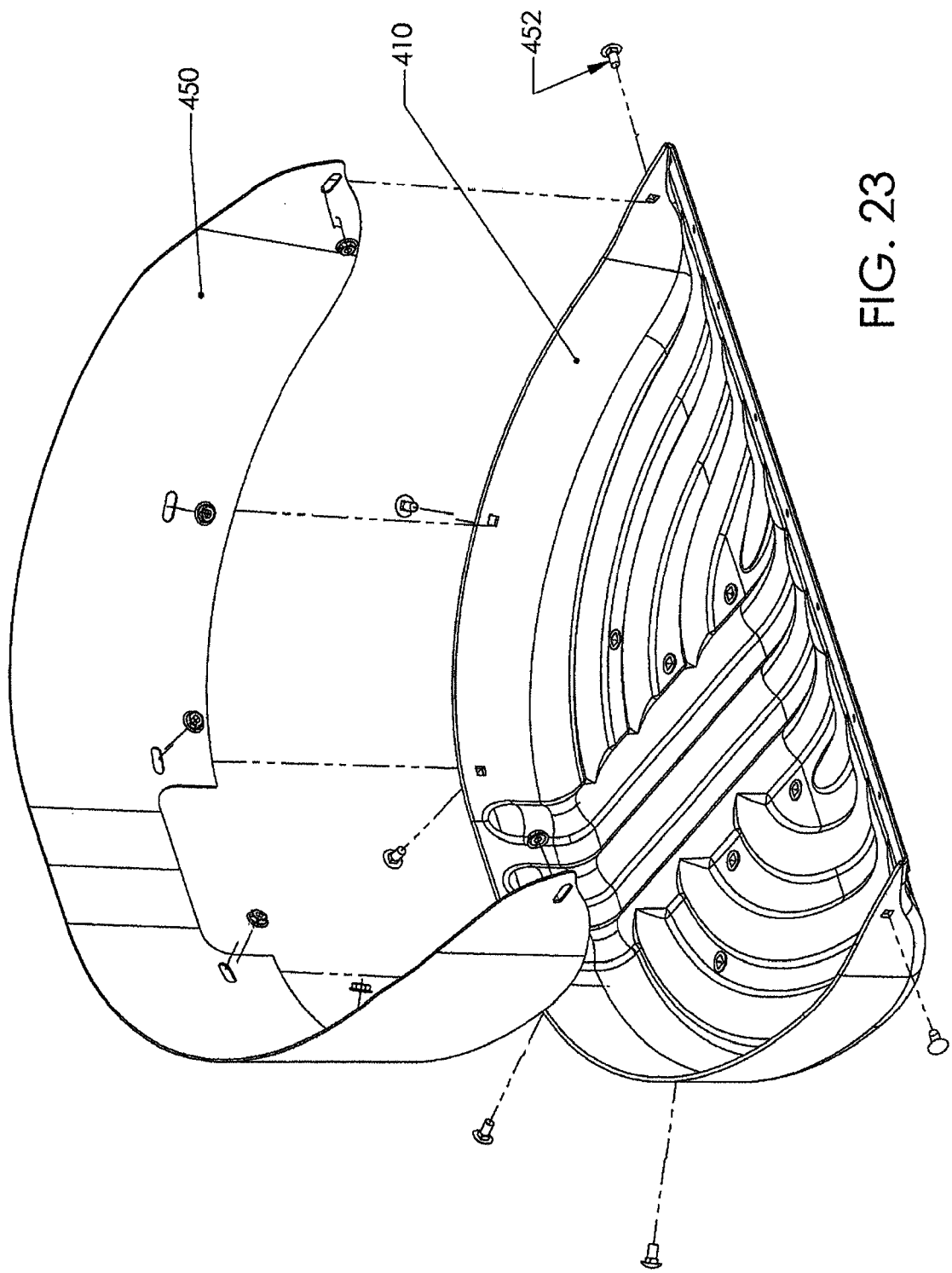
Figure 24:
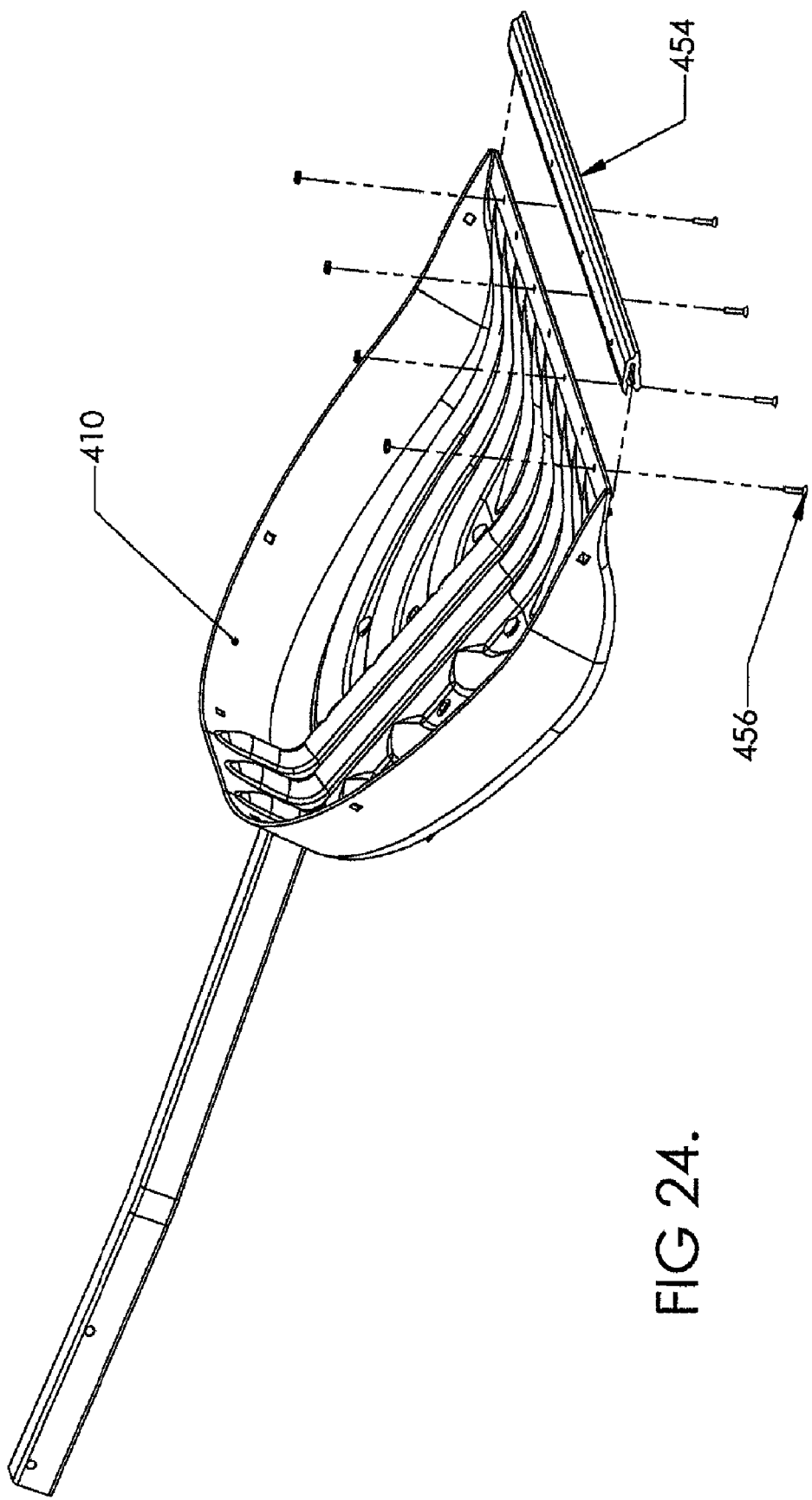
Figure 25:
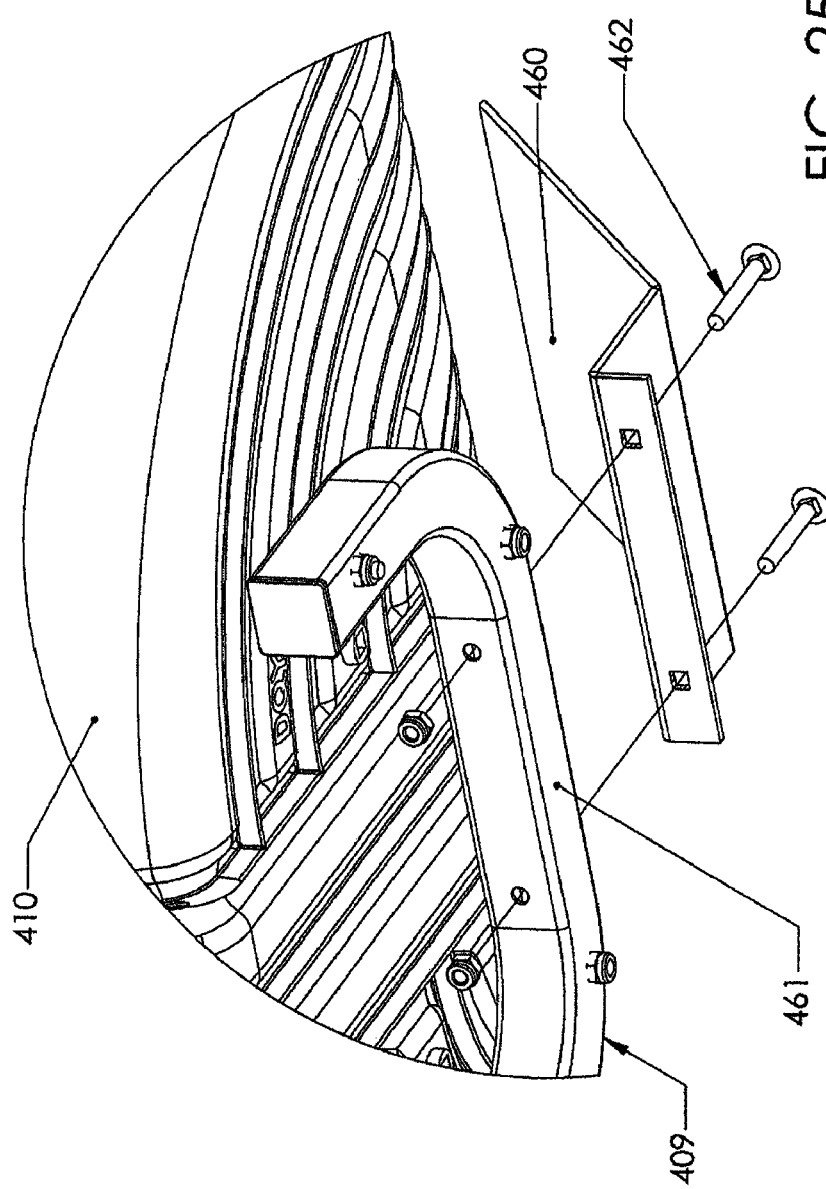
Figure 26:
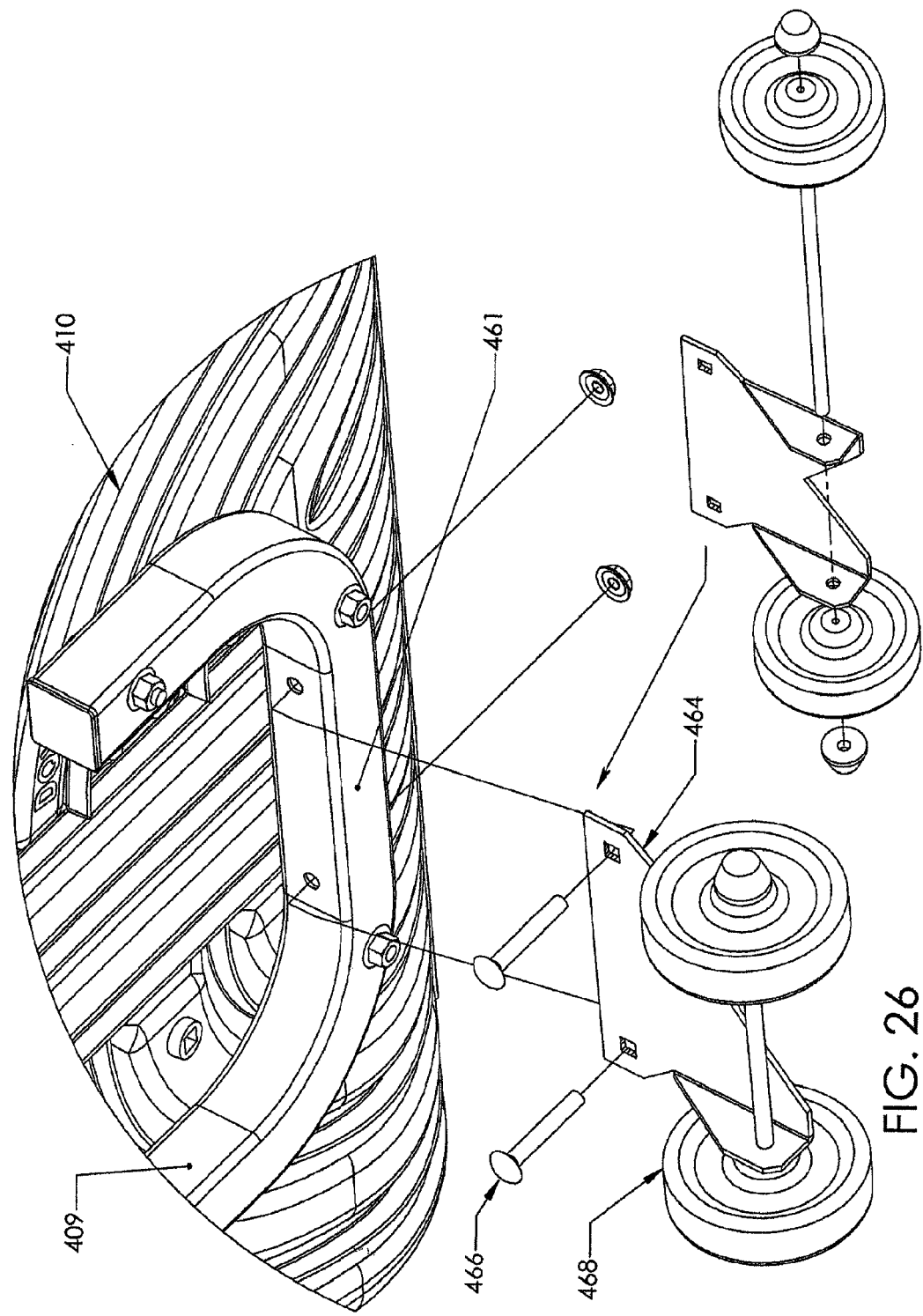
Figure 27:
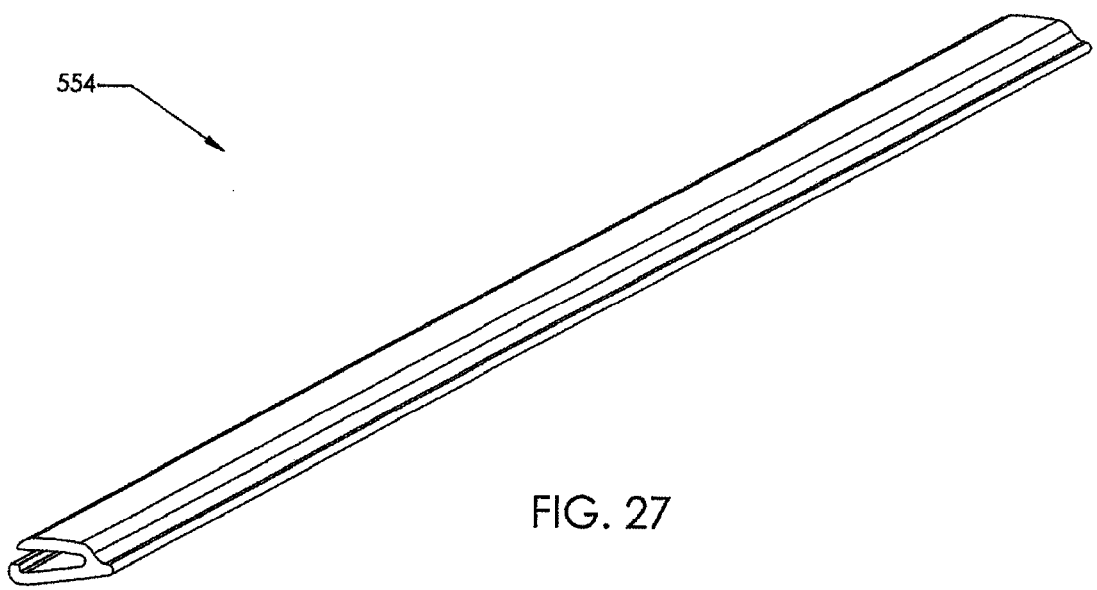
Figure 28:
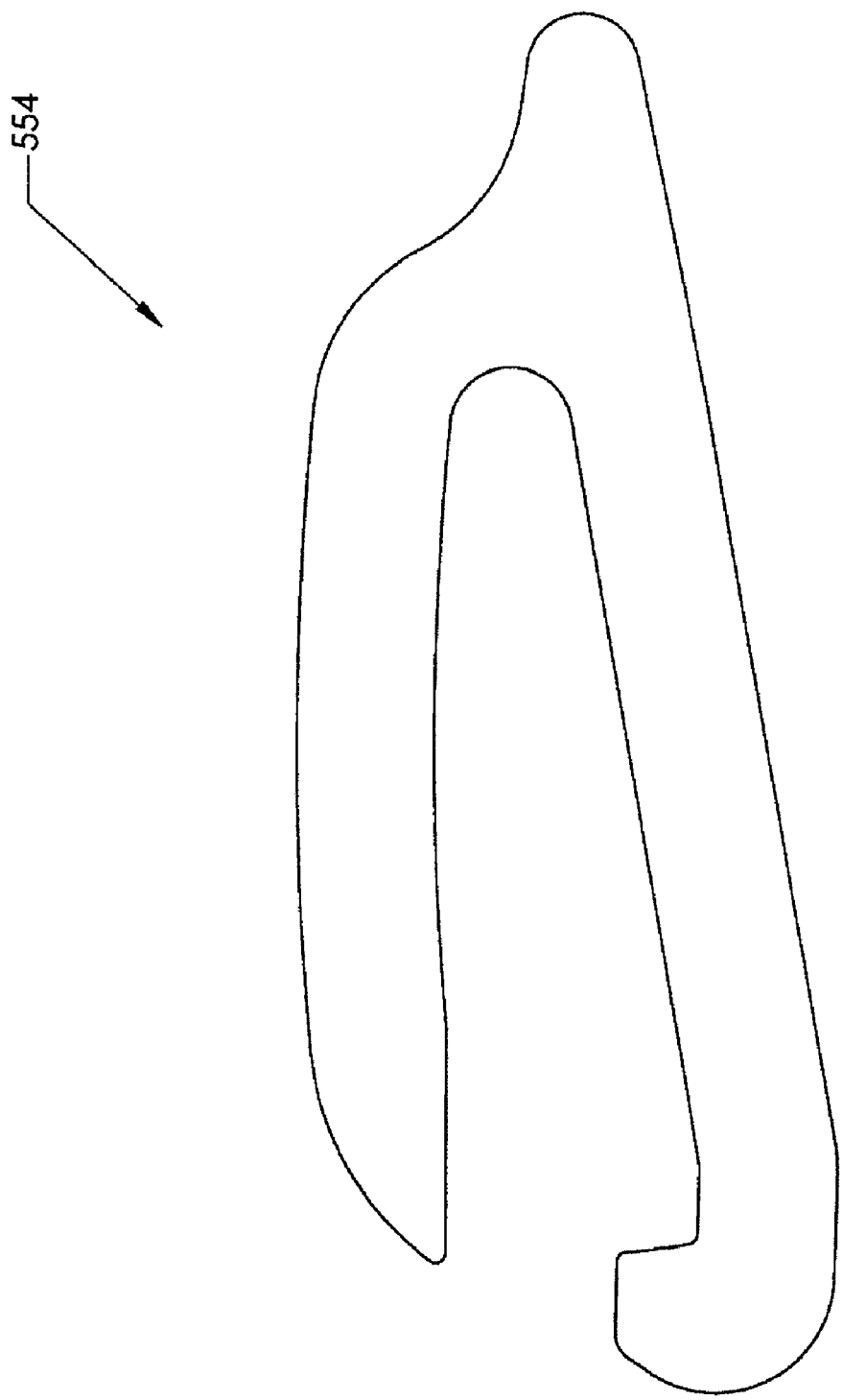

FIG. 3 is a perspective view of the wheeled shovel shown in FIG. 1, and again illustrating the wheeled shovel in an open, unfolded, or ready-for-use configuration but with the hinge apparatus in a third or highest handle height setting such that the wheeled shovel's handle height is higher than the handle height when the hinge apparatus is in the first or second handle height settings respectively shown in FIGS. 1 and 2;

FIG. 4 is a side elevation view illustrating the wheeled shovel shown in FIG. 1 with the different handle positions shown in FIGS. 2 and 3 superimposed thereon in order to illustrate different handle heights and angular values that are possible with the hinge apparatus according to one exemplary embodiment;

FIG. 5 is a perspective view of the wheeled shovel shown in FIG. 1 and illustrating the wheeled shovel in a closed or folded configuration in which the handle is disposed rearward of the shovel blade and the upper frame portion has been pivoted relatively towards the lower frame portion about the rod portion of the axle connector;

FIG. 6 is a perspective view of the wheeled shovel shown in FIG. 1 and illustrating the wheeled shovel with the wheel removed and in a closed or folded configuration in which the handle is disposed rearward of the shovel blade and the upper frame portion has been pivoted relatively towards the lower frame portion about the rod portion of the axle connector;

FIG. 7 is a perspective view of the wheeled shovel shown in FIG. 1 and illustrating the wheeled shovel with the wheel removed and in a closed or folded configuration in which the handle is disposed forward of the shovel blade and the upper frame portion has been pivoted relatively towards the lower frame portion about the rod portion of the connector of the hinge apparatus;

FIG. 8 is a partial perspective view of the wheeled shovel shown in FIG. 1, and illustrating the hinge apparatus in the first or lowest handle height setting;

FIG. 9 is a partial perspective view of the wheeled shovel shown in FIG. 2, and illustrating the hinge apparatus in the second or intermediate handle height setting;

FIG. 10 is a partial perspective view of the wheeled shovel shown in FIG. 3, and illustrating the hinge apparatus in the third or highest handle height setting;

FIG. 11 is a perspective view of the wheeled shovel shown in FIG. 2, where the wheel has been removed and the hinge apparatus is in the second or intermediate handle height setting;

FIG. 12 is a partial perspective view of the wheeled shovel shown in FIG. 5, and illustrating the hinge apparatus and upper and lower frame portions where the upper frame portion has been pivoted relatively towards the lower frame portion about the rod portion of the axle connector;

FIG. 13 is a partial perspective view of the wheeled shovel shown in FIG. 7, and illustrating the hinge apparatus and upper and lower frame portions where the upper frame portion has been pivoted relatively towards the lower frame portion about the rod portion of the connector of the hinge apparatus;

FIG. 14 is an exploded perspective view of the hinge apparatus shown in FIGS. 1 through 13, and illustrating the linking members of the hinge apparatus, openings for the axle, openings for selecting one of the different handle height settings, quick release connector and pin for hingedly connecting the upper frame portion to the lower frame portion where the quick release connector is aligned with the second or intermediate handle height setting, and the axle connector for releasably engaging the wheel to the frame of the wheeled shovel;

FIG. 15 is a perspective view of a wheeled shovel with a hinge apparatus according to another exemplary embodiment, and illustrating the wheeled shovel in an open, unfolded, or ready-for-use configuration with the hinge apparatus in a first or lowest handle height setting;

FIG. 16 is a perspective view of the wheeled shovel shown in FIG. 1, and again illustrating the wheeled shovel in an open, unfolded, or ready-for-use configuration but with the hinge apparatus in a second or intermediate handle height setting such that the wheeled shovel's handle height is higher than the handle height when the hinge apparatus is in the first handle height setting shown in FIG. 15;

FIG. 17 is a perspective view of the wheeled shovel shown in FIG. 1, and again illustrating the wheeled shovel in an open, unfolded, or ready-for-use configuration but with the hinge apparatus in a third or highest handle height setting such that the wheeled shovel's handle height is higher than the handle height when the hinge apparatus is in the first or second handle height settings respectively shown in FIGS. 15 and 16;

FIG. 18 is a side elevation view illustrating the wheeled shovel shown in FIG. 15 with the different handle positions shown in FIGS. 16 and 17 superimposed thereon in order to illustrate the different handle heights that are possible with the hinge apparatus;

FIG. 19 is a perspective view of the wheeled shovel shown in FIG. 15 and illustrating the wheeled shovel in a closed or folded configuration in which the handle is disposed rearward of the shovel blade and the upper frame portion has been pivoted relatively towards the lower frame portion about the rod portion of the axle connector;

FIG. 20 is a partial perspective view of the wheeled shovel shown in FIG. 15, and illustrating the hinge apparatus in the first or lowest handle height setting;

FIG. 21 is a perspective of a wheeled shovel including the hinge apparatus shown in FIG. 1 assembly according to another exemplary embodiment;

FIG. 22 is a perspective of a wheeled shovel including the hinge apparatus shown in FIG. 1, where the wheeled shovel includes an exemplary powder snow shovel extension and an exemplary wear strip along a leading edge portion of the shovel blade according to an exemplary embodiment;

FIG. 23 is a perspective view illustrating an exemplary manner by which the powder snow shovel extension/attachment may be attached to the shovel blade shown in FIG. 22 via exemplary mechanical fasteners according to an exemplary embodiment;

FIG. 24 is a perspective view illustrating an exemplary manner by which the wear strip may be attached to the shovel blade shown in FIG. 22 via exemplary mechanical fasteners according to an exemplary embodiment;

FIG. 25 is a perspective view illustrating an exemplary manner by which a chipper plate may be attached to the shovel blade shown in FIG. 22 via exemplary mechanical fasteners according to an exemplary embodiment;

FIG. 26 is a perspective view illustrating an exemplary manner by which exemplary mechanical fasteners may be used to provide the shovel blade shown in FIG. 22 with rollers or wheels for easing travel of the blade over rough ground, such as a gravel-covered surface, according to an exemplary embodiment;

FIG. 27 is a perspective view of a snap-on wear strip that may be attached to along a leading edge portion of a shovel blade without requiring the use of mechanical fasteners according to an exemplary embodiment; and FIG. 28 is an end view of the snap-on wear strip shown in FIG. 27.

DETAILED DESCRIPTION

The following description is merely exemplary in nature and is in no way intended to limit the present disclosure, application, or uses.

According to various aspects of the present disclosure, there are provided various exemplary embodiments of hinge apparatus, which may be used, for example, to hingedly connect upper and lower frame members of a device or tool, such as a manually-operated wheeled shovel. Other aspects relate to wheeled shovels that include hinge apparatus. Further aspects relate to methods of using and/or making wheeled shovels and/or the components thereof.

In one exemplary embodiment of a hinge apparatus, first and second linking members each include a base portion, sidewalls, and flange portions. The flange portions define sets of openings configured to receive a portion of a first connector, for selectively adjusting the angular orientation of the upper frame member relative to the lower frame member in an open, ready-for-use configuration. The linking members include connector openings configured to receive a portion of a second connector. When the first connector is not engaged with any set of openings, the upper frame member is pivotably movable relative to the lower frame member about the second connector to a closed, collapsed configuration in which the upper frame member is alongside the lower frame member.

In another exemplary embodiment, a wheeled shovel generally includes a frame having an upper frame member and a lower frame member. A handle is disposed at an upper end portion of the upper frame member. A shovel blade is disposed at a lower end portion of the lower frame member. A wheel assembly includes a wheel and an axle with an opening configured to receive a portion of an axle connector. A hinge apparatus includes first and second linking members. The first linking member is disposed at a lower end portion of the upper frame member. The second linking member is disposed at an upper end portion of the lower frame member. The first and second linking members include axle connector openings configured to receive a portion of an axle connector, for attaching the wheel assembly when the axle connector is engaged with the opening of the axle and the axle connector openings of the first and second linking members. The first and second linking members include first and second sets of openings configured to receive a portion of a connector, for selective adjustment to the handle height. When the connector is engaged with the first set of openings and the wheeled shovel is in a first open, ready-for-use configuration, the upper frame member is at a first angular orientation relative to the lower frame member and the handle is at a first handle height. When the connector is engaged with the second set of openings and the wheeled shovel is in a second open, ready-for-use configuration, the upper frame member is at a second angular orientation relative to the lower frame member less than the first angular orientation such that the handle is at a second handle height higher than the first handle height. When the connector is not engaged with the first or second set of openings, the upper frame member is pivotably movable relative to the lower frame member about the axle connector to a closed, collapsed configuration in which the upper frame member is alongside the lower frame member and the handle is adjacent the shovel blade.

Another exemplary embodiment provides a hinge apparatus for hingedly connecting upper and lower frame members of a device. In this exemplary embodiment, the hinge apparatus generally includes first and second linking members. Each linking member includes a base portion, spaced-apart sidewalls extending outwardly from the base portion and configured for receiving a portion of the respective upper and lower frame members generally between spaced-apart sidewalls, and spaced-apart flange portions extending outwardly beyond the base portion in a direction generally opposite the sidewalls. The flange portions define sets of openings configured to receive a portion of a first connector, for selectively adjusting the angular orientation of the upper frame member relative to the lower frame member in an open, ready-for-use configuration. The first and second linking members include connector openings configured to receive a portion of a second connector. When the first connector is not engaged with any of the sets of openings, the upper frame member is pivotably movable relative to the lower frame member, about the second connector engaged with the connector openings to a closed, collapsed configuration in which the upper frame member is alongside the lower frame member.

Another exemplary embodiment includes a hinge apparatus for hingedly connecting upper and lower frame members of a wheeled device. The wheeled device may include a wheel assembly having a wheel and an axle with an opening configured to receive a portion of an axle connector and a handle disposed at an upper end portion of the upper frame member. In this exemplary embodiment, the hinge apparatus includes first and second linking members. Each linking member includes a base portion, spaced-apart sidewalls extending outwardly from the base portion and configured for receiving a portion of the respective upper and lower frame members generally between the spaced-apart sidewalls, and spaced-apart flange portions extending outwardly beyond the base portion in a direction generally opposite the sidewalls. The flange portions define sets of openings configured to receive a portion of a connector, for selectively adjusting the angular orientation of the upper frame member relative to the lower frame member and the handle height for the wheeled device in an open, ready-for-use configuration. The first and second linking members include axle connector openings configured to receive a portion of an axle connector, for attaching the wheel assembly when the axle connector is engaged with the opening of the axle and the axle connector openings of the first and second linking members. When the connector is not engaged with any of the sets of openings, the upper frame member is pivotably movable relative to the lower frame member, about the axle connector engaged with the axle connector openings, to a closed, collapsed configuration in which the upper frame member is alongside the lower frame member and the handle is adjacent a lower portion of the lower frame member.

Other aspects relate to methods of using devices having a hinge apparatus. In one exemplary embodiment, there is provided a method of using a wheeled shovel that includes a frame having upper and lower frame members hingedly connected by a hinge apparatus, a handle disposed at an upper end portion of the upper frame member, a shovel blade disposed at a lower end portion of the lower frame member, a wheel assembly having a wheel and an axle with an opening configured to receive a portion of an axle connector. In this exemplary embodiment, a method generally includes engaging a connector with a first or second set of openings defined by first and second linking members of the hinge apparatus, to thereby select a respective first or second handle height for the wheeled shovel in an open, ready-for-use configuration with the upper frame member at a respective first or second angular orientation relative to the lower frame member, the second angular orientation being less than the first angular orientation such that the second handle height is higher than the first handle height.

In various exemplary embodiments, there is provided a wheeled shovel, which may be used for picking up, transport, and disposal of materials (e.g., snow, etc.) in an efficient and effective manner. Other aspects relate to components of wheeled shovels. Further aspects relate to methods of using and/or making wheeled shovels and/or components thereof. Additional aspects relate to hinge apparatus for hingedly connecting upper and lower frame members of a tool or device.

As recognized herein, there is a need for snow shovels capable of lifting, throwing, and pushing snow like a plow. Accordingly, there is described and shown herein various embodiments of wheeled shovels that may be manually operated for plowing as well as for lifting and throwing snow with ease and with less effort. Also recognized herein are possible benefits relating to transportation (e.g., in a trunk of a car, etc.) and storage of wheeled shovels in that various embodiments provide wheeled shovels that may be folded or collapsed into a relatively compact configuration.

Various aspects disclosed herein relate generally to wheeled shovels configured for moving and disposing of materials. Other aspects relate generally to methods relating to using, assembling, disassembling, storing, and/or transporting wheeled shovels. Still further aspects relate to kits including components capable of being assembled into a wheeled shovel, and methods that generally include receiving such a kit, and assembling the components within the kit into a wheeled shovel.

Any one or more aspects disclosed herein may be implemented individually or in any combination with any one or more of the other disclosed aspects.

FIG. 1 illustrates an exemplary embodiment of a wheeled shovel 100 embodying one or more aspects of the present disclosure. As shown in FIG. 1, the wheeled shovel 100 generally includes a wheel assembly 102 and a driving member, frame, or yoke 106. A handle 108 is disposed at an upper end portion of the driving member 106. A shovel blade 110 is disposed at a lower end portion of the driving member 106. In addition, the wheeled shovel 100 also includes a hinge apparatus 112 with two frame linking members 114 that generally link or connect the upper and lower frame portions or members 107, 109. In this illustrated embodiment, the wheel assembly 102 generally includes two removably attachable pieces 104A and 104B. The wheel assembly 100 also includes a tire 105 on the rim that is cooperatively defined by the wheel pieces 104A, 104B. Exemplary embodiments of a wheel assembly are disclosed in U.S. Provisional Patent Application No. 60/991,217 filed Nov. 29, 2007, titled "WHEEL ASSEMBLIES" and/or U.S. Non-Provisional Patent Application No. 11/955,892 filed Dec. 13, 2007, titled "WHEEL ASSEMBLIES." The disclosures of these patent applications are incorporated herein by reference. In addition, other embodiments of a wheeled shovel may include any one or more (but not necessarily all) of the components and/or assemblies 102, 104, 106, 108, 110, and 112, as the components and/or assemblies 102, 104, 106, 108, 110, and 112 may be implemented individually or in any combination with any one or more of the other components and/or assemblies 102, 104, 106, 108, 110, and 112. Accordingly, aspects of the present disclosure also include the individual components themselves and assemblies disclosed herein. In addition, other embodiments may include one or more of the components being used with other devices (e.g., non-wheeled shovels, outdoor gardening or yard tools, rakes, hoes, etc.). Therefore, the specific references to wheeled shovels herein should not be construed as limiting the scope of the invention to only wheeled shovels.

With reference to FIGS. 1 through 7, the linking members 114 allow the upper frame member 107 (with the handle 108 attached thereto) to be folded or closed upon the lower frame member 109. In FIGS. 1-3, the wheeled shovel 100 is shown in an open, unfolded, or ready-for-use configuration at different handle height settings, whereas FIGS. 5, 6, and 7 illustrate the wheeled shovel 100 in alternative closed or folded configurations.

More specifically, FIG. 1 illustrates the wheeled shovel 100 in an open, unfolded, or ready-for-use configuration with the hinge apparatus 112 in a first or lowest handle height setting 116 (also shown in FIGS. 8 and 14). FIG. 2 illustrates the wheeled shovel 100 in an open, unfolded, or ready-for-use configuration with the hinge apparatus 112 in a second or intermediate handle height setting 118 (also shown in FIGS. 9 and 14) where the wheeled shovel's handle height H2 (FIG. 4) is higher than the handle height H1 when the hinge apparatus 112 is in the first handle height setting 116 (FIGS. 1 and 8). FIG. 3 illustrates the wheeled shovel 100 in an open, unfolded, or ready-for-use configuration with the hinge apparatus 112 in a third or highest handle height setting 120 (also shown in FIGS. 10 and 14) such that the wheeled shovel's handle height H3 (FIG. 4) is higher than the respective handle heights H1 or H2 when the hinge apparatus 112 is in the first handle height setting 116 (FIGS. 1 and 8) or the second handle height setting 118 (FIGS. 2 and 9).

FIG. 5 illustrates the wheeled shovel 100 in a closed or folded configuration in which the handle 108 is disposed rearward of the shovel blade 110 and the upper frame portion 107 has been pivoted relatively towards the lower frame portion 109 about the rod portion 124 of the axle connector 122 (shown in FIG. 14). FIG. 6 also shows the wheeled shovel 100 (with the wheel 104 removed) in a closed or folded configuration in which the handle 108 is disposed rearward of the shovel blade 110 and the upper frame portion 107 has been pivoted relatively towards the lower frame portion 109 about the axle tube or rod portion 124 of the axle connector 122. FIG. 7 illustrates the wheeled shovel 100 (with the wheel 104 removed) in a closed or folded configuration in which the handle 108 is disposed forward of the shovel blade 110 and the upper frame portion 107 has been pivoted relatively towards the lower frame portion 109 about the rod portion 128 of the connector 126 (also shown in FIGS. 8 and 14) of the hinge apparatus 112.

The folded or closed configurations shown in FIG. 5, 6, or 7 may be used, for example, to facilitate storage or transportation (e.g., in a trunk of a car, etc.) of the wheeled shovel 100, for example, because less space will be needed for the folded wheeled shovel 100. When a user wants to use the wheeled shovel 100, the user may then unfold the shovel by pivoting the upper frame member 107 relative to the lower frame member 109, whereby the linking members 114 are moved into the configuration shown in FIG. 1, 2, or 3 depending on which handle height is desired. In some embodiments, the wheel 104 (FIGS. 6 and 7) may also be removed, for example, to facilitate storage and/or transportation of the wheeled shovel 100.

With reference to FIG. 4, the aligned sets of openings 116, 118, 120 of the hinge apparatus 112 provide the wheeled shovel 100 with three different selectable handle heights. Continuing with this example, when the connector 126 is inserted through the corresponding set of openings 116 (FIG. 14) thus selecting the first or lowest handle height setting, the handle 108 may be positioned at a height H1 of about forty-one inches above a datum plane (e.g., level ground or other surface supporting the wheeled shovel 100, etc.). In addition, the upper frame member 107 may be at a first angular orientation relative to the lower frame member 109 of about one hundred sixty seven degrees. Positioning the connector 126 through the second set of openings 118 (FIG. 14) thus selecting the second or intermediate handle height setting, the handle 108 may be positioned at a height H2 of about forty-three inches above a datum plane, and the upper frame member 107 may be at a second angular orientation relative to the lower frame member 109 of about one hundred sixty degrees. Positioning the connector 126 through the second set of openings 120 (FIG. 14) thus selecting the third or highest handle height setting, the handle 108 may be positioned at a height H3 of about forty-five inches above a datum plane, and the upper frame member 107 may be at a third angular orientation relative to the lower frame member 109 of about one hundred fifty two degrees. The dimensions and angular values provided in this paragraph (as are all dimensions and angular values set forth herein) are mere examples provided for purposes of illustration only, as the hinge apparatus may be configured so as to provide different angular value and/or dimensions depending, for example, on the particular application and/or user. Other embodiments may include a hinge apparatus configured differently (e.g., different heights, more than three selectable handle heights, less than three selectable handle heights, etc.) than hinge apparatus 112. For example, FIGS. 15 through 20 illustrate a hinge apparatus 212 that may be used with another embodiment of a wheeled shovel 200.

As shown in FIG. 6, this particular embodiment of the wheeled shovel 100 has the shovel blade 110 attached (e.g., via mechanical fasteners, etc.) to a lower generally J-shaped end portion of the lower frame member 109. In some embodiments, the J-shaped end portion may be configured for providing additional strength and rigidity to the lower frame member 109. Alternative embodiments may include different attachment means for attaching the shovel blade 110 to the wheeled shovel 100. Still other embodiments may include a shovel blade integrally or monolithically formed with the lower frame member such that the shovel blade does not need to be separately attached to the lower frame member.

The handle 108 generally includes two pieces attached to generally opposite sides of an upper frame member 107. While the illustrated embodiment shows the handle pieces attached to the upper frame member 107 via mechanical fasteners, other suitable means (e.g., welding, adhesives, etc.) can be employed and/or other handle configurations are possible for alternative embodiments. For example, other embodiments may include a handle integrally or monolithically formed with the upper frame member such that the handle does not need to be separately attached to the upper frame member.

As shown in FIG. 14, each linking member 114 includes a base portion 145, spaced-apart sidewalls 147 extending outwardly from the base portion 145, and spaced-apart ears or flange portions 149 extending outwardly beyond the base portion 145 in a direction generally opposite the sidewalls 147. As shown in FIG. 1, the base portion 145 of each linking member 114 is positioned adjacent or on the upper surface of the corresponding upper or lower frame member 107, 109. In addition, the spaced-apart sidewalls 147 are configured for receiving a portion of the respective upper and lower frame member 107, 109 with the space or channel defined generally between the spaced-apart sidewalls 147.

With further reference to FIG. 14, each ear or flange portion 149 includes three holes 116, 118, 120 in a generally triangle configuration. Alternative embodiments may include differently configured holes (e.g., more or less than three, arranged in non-triangular configurations, located elsewhere, etc.).

In addition, the linking members 114 may be positioned with their ears or flange portions 149 in an overlapping or alternating arrangement as shown in FIG. 14. Accordingly, when the wheeled shovel 100 is in an open, ready-for-use configuration (FIGS. 1 through 3), one of the first linking member's flange portions 149 may be disposed generally between the second linking member's flange portions 149. Likewise, one of the second linking member's flange portions 149 may be disposed generally between the first linking member's flange portions 149, as shown in FIG. 14.

In addition, the linking members 114 further include holes 142 through the sidewalls 147 for receiving mechanical fasteners (e.g., nut and bolt assemblies, etc.) for attaching the linking members 114 to the corresponding frame members 107 and 109. While this particular embodiment attaches the linking members 114 to the respective frame members 107 and 109 via mechanical fasteners, other suitable means (e.g., welding, adhesives, etc.) can be employed. By way of further example, another embodiment may include linking members that are integrally or monolithically formed with the respective upper and lower frame members such that the linking members do not need to be separately attached to the respective upper and lower frame members.

FIG. 14 also illustrates exemplary quick release connectors 122 and 126. Both connectors 122 and 126 and pins 130 (FIG. 13) and 132 may be generally used for engaging the frame linking members 114 to each other. The axle connector 122 and pin 124 (FIG. 13) may also be used for attaching the wheel assembly 102 to the driving member 106. The axle connector 122 includes a rod portion 124 that may be inserted through openings or holes 144, and then through the axle of the wheel assembly 102. From the other side of the wheeled shovel 100 (the side opposite the hinge apparatus 112 and frame 106), the pin 124 may then be inserted into the hole or opening 146 on the rod portion 124, thereby securing the wheel assembly 102 to the frame 106. In addition, the connector 122 and pin 132 may be used for engaging and holding the frame linking members 114 in one of the unfolded or open positions shown in FIGS. 1 through 3. Alternative embodiments may be a single hardware piece that operates or functions as the connector 122 and pin 132. Alternatively, other suitable devices and means can be employed for engaging the frame linking members 114 to each other and/or for attaching the wheel assembly 102 to the driving member 106.

To allow for relative pivotal movement of the frame linking members 114 from one of the open/unfolded configurations shown in FIGS. 1 through 3, to one of the folded/closed configurations shown in FIG. 5, the pin 132 (FIG. 14) is removed from the opening at the end portion of the rod portion 128 of the connector 126. Then, the connector 126 may be removed from the corresponding set of openings 116, 118, or 120. The linking members 114 may now be pivoted relative to each other to the folded configuration shown in FIG. 5 in which the upper drive member 107 (and handle 108 attached thereto) is positioned adjacent the lower drive member 109. Accordingly, the folded wheeled shovel 100 may have a fairly compact folded configuration with a shorter overall effective frame length, which may, for example, facilitate storage and/or transportation (e.g., in a trunk of a car, etc.) of the wheeled shovel 100. In some embodiments, the wheeled shovel 100 may have an even more compact folded configuration by removing the wheel 104 (FIGS. 6 and 7) in an exemplary manner described below.

When a user wants to use (and thus unfold) the wheeled shovel 100, the user may pivot the upper frame member 107 relative to the lower frame member 109, whereby the linking members 114 are moved from the configuration shown in FIG. 5 to the configuration shown in FIG. 1, 2, or 3. The user may then select a handle height setting by inserting the rod portion 128 of the connector 126 into the corresponding set of aligned holes 116 (FIG. 1), 118 (FIG. 2), or 120 (FIG. 3) of the frame linking members 114 (FIG. 14). The pin 132 (FIG. 14) may then be inserted into the opening 148 through the end portion of the connector 126 to thereby retain the connector 126 within the openings 116, 118, or 120 of the frame linking members 114.

In addition, the exemplary quick release connector or axle 122 and pin 130 also allows the wheel 104 to be readily removed from the wheeled shovel 100, for example, to facilitate storage and/or shipment of the disassembled wheeled shovel 100. To remove the wheel 104, the user first removes the pin 130 from the opening 146 (FIG. 114) at the end portion of the connector 126. The connector 122 may then be removed from the opening at the wheel axle and from the openings 144 of the frame linking members 114, thereby releasing the wheel 104. FIGS. 6, 7, and 11 illustrate the wheeled shovel 100 after removal of the wheel 104.

The wheel 104 may also be readily reattached by inserting the rod portion 124 (FIG. 14) of the connector 122 through the openings 144 of the frame linking members 114 and the opening at the wheel axle. The pin 130 may then be inserted into the opening 146 through the end portion of the connector 122 to thereby retain the connector 122 within the opening at the wheel axle and openings 144 of the frame linking members 114. These exemplary aspects of the present disclosure relating to the folding features of the wheeled shovel 100 may also be implemented with other exemplary wheeled shovel embodiments, non-wheeled shovels, rakes, hoes, garden equipment, etc.

In various embodiments, a frame linking member 114 may be integrally or monolithically formed as a single component. For example, a frame linking member 114 may be formed by stamping (or other suitable method, such as drilling, etc.) in a piece of material holes 116, 118, 120, 142, and 144. After forming the holes 116, 118, 120, 142, and 144, the material may then be folded to form a frame linking member 114 as shown in FIG. 14. Alternatively, the folding may be performed prior to forming all of the holes 116, 118, 120, 142, and 144. Even though a frame linking member 114 may be formed integrally in this example, such is not required for all embodiments. Alternative configurations (e.g., shapes, sizes, etc.), materials, and manufacturing methods (e.g., drawing, etc.) can be used for making a frame linking member 114.

A wide range of materials may be used for frame linking members 114. In one exemplary embodiment, the frame linking members 114 may be formed from painted or galvanized steel (e.g., ten, eleven, or twelve gauge steel, etc.), although other suitable materials may be used in other embodiments. In some embodiments, the linking members 114 are formed from a material having a heavier gauge than the material used for the frame 106, for example, to provide structurally reinforcement to the frame 106. Using a material for the linking members 114 that is a heavier gauge material than the material used for the frame 106 may thus allow a lighter and less costly material to be used for the frame 106 without compromising the structural capabilities of the wheeled shovel 100.

In alternative embodiments, however, a relatively heavy gauge material may also be used for the frame, such as when the wheeled shovel is for a stronger user. In some embodiments, the attachment of the frame 106 is located at or near the wheel axle, which may also increase the strength and durability of the wheeled shovel 100.

With reference to FIG. 1, the wheel 104 and the blade 110 are shown positioned relative to the driving member 106 in a manner such that the blade 110 rests on the ground in its normal position. By way of example only, an operator may use the handle 108 to move the shovel 100 in any direction by rolling the wheel 104 on the ground. The operator may also use the handle 108 to guide the shovel 100 in shoving into the blade 110 material lying along the blade's path. The operator may then lift the shovel blade 110 off the ground to pick up a load of material, followed by further lifting to balance the load at a comfortable walking posture. The operator may then move generally forward to the desired destination. At the desired destination and while continuing to move generally forward, the operator may then press on the handle 108 with a quick downward body and/or arm motion to propel the load away from the shovel 100. The operator may dispose of the material generally or mostly straight ahead by directing the shovel 100 in the direction of the motion of the wheeled shovel 100. Alternatively, the operator may also dispose of the material generally to the side of the wheeled shovel 100 by angling slightly to the sides while keeping the wheeled shovel 100 generally upright. In which case, the operator would direct or steer the wheeled shovel 100 (with the wheel 104 generally upright) to point at least partially to the side as the handle 108 is pushed downwardly (or just prior thereto) so that when the load is lifted and thrown, the load will project to the side and out of the path of shoveling. Plus, a user may also lean into the turns while using the wheeled shovel 100, for example, to further enhance maneuverability similar to the manner in which a bicycle or motorcycle rider leans into turns.

The relatively large wheel assembly 102 may allow a user to lift the blade 110 and snow thereon above the unshoveled snow height such that the blade 110 can travel over the unshoveled snow or other rough surface without hitting, pushing through, or compressing (or with relatively little compression) unshoveled areas to be traversed. In some embodiments, the wheel 104 is also relatively narrow, which, in turn, may help reduce the amount of compression of the unshoveled areas as the wheeled shovel 100 is rolled across those unshoveled areas.

The relatively high handle 108 of the shovel 100 may enable the user to comfortably accelerate forward the load of snow off the blade 110 while pushing down the handle 108, which enhances the throw distance of the snow trajectory. The larger wheel 104 with a higher axle may also provide greater distance over which to accelerate and throw the load. The larger wheel 104 may also facilitate carrying the snow, if needed, above deep snow and enable the wheel 104 to more easily roll over steps, curbs, snow piles, etc.

The wheel assembly 102, driving member 106, and shovel blade 110 may be formed ergonomically to assist in picking up and releasing a large amount of material, such as sand, gravel, garden materials or snow, generally aligned in the direction of motion, with less stress to the body of the operator, and especially to help prevent (or at least reduce) back stress or injury. During operation, a downward force applied to the wheeled shovel's handle 108 may be translated or transferred through the axle/lever to briskly lift the shovel blade 110 and its load, and causing the load to be thrown or propelled away from the shovel blade 110. The material can be thrown or propelled forward or towards the side, as desired, while the wheel 104 is in motion.

In the illustrated embodiment of FIG. 1, the driving member 106 is formed of continuous metal tubing. Alternatively, other suitable materials may be used for the driving member 106. In some embodiments, the tubing material for the driving member 106 may be formed from hollow aluminum, or other metal tubing. Non-metal materials (e.g., plastics, fiberglass, composite materials, etc.) may also be used for the driving member 106.

As shown in FIG. 1, the frame 106 is disposed generally along only one side of the wheel 104. One end of the wheel axle is coupled to the frame 106 in a cantilevered type mounting arrangement. The frame 106 may be configured so as to generally curve about the wheel 104, for example, such that the wheel 104 may be cantilevered and/or aligned generally with a center of gravity for the frame 106 and/or centered relative to a centerline of the shovel blade 110 and/or handle 108. In such embodiments, the linking members 114 may be configured for providing sufficient structural support and strength to allow for the cantilevered mounting arrangement of the axle and hub to the frame 106.

In the illustrated embodiment, the wheel assembly 102 comprises the wheel 104. Depending on the particular application, the wheel assembly 102 may also include a rim and spokes connecting the hub and/or axle to the rim. Different types of wheels 104 may be used, including non-spoked solid wheels (e.g., solid disk wheel/rim, etc.), different treads, widths or a continuous web connecting the axle to a rim. Moreover, the wheel assembly 102 may include a tire with an air-inflatable tube, a tubeless air-inflatable tire, a non-pneumatic airless tire, an extruded tire, etc. Some embodiments include a relatively narrow wheel, which may provide the advantage of not packing down snow, for example, when shoveling snow (e.g., a narrower wheel can more easily cut through the snow with less resistance, etc.). The dimensions of the wheel 104 and the position of the handle 108 relative to the wheel's axle may be determined generally with respect to the position of the arms of a human body. In some embodiments, the diameter of the wheel 104 may be between about thirty inches and about thirty-eight inches.

In various embodiments, the overall length of the wheeled shovel 100 may be between about sixty-two inches to about seventy inches in some embodiments, or between about sixty-six inches to about eighty-eight inches in other embodiments, or between about seventy-four inches to about seventy-six inches in further embodiments, or between about sixty-six inches to seventy-eight inches in additional embodiments, or is about seventy-two inches in alternative embodiments.

In various embodiments, a distance from the tip of the shovel blade 110 to a fulcrum area near the center of the wheel assembly 102 may be between about thirty inches and about forty-six inches (e.g., forty two inches in one embodiment, etc.). The dimensions provided in the above paragraphs (as are all dimensions set forth herein) are mere examples provided for purposes of illustration only, as a wheeled shovel can be configured with different dimensions depending, for example, on the particular application and/or user of the wheeled shovel.

The relationship between the wheel diameter, overall shovel length, frame shape, blade angle of attack, and shovel handle height may determine the ease with which snow may be shoveled. For example, the positioning of the handle 108 generally between the operator's chest and waist (which may vary depending on the height of the operator and conditions, such as depth of snow, clearing snow on a hill, etc.) may assist in pushing the accumulated snow or other material that is being shoveled. The higher handle position may also give greater acceleration range for throwing the snow. A ratio greater than one-to-one (1:1) between the length of the driving member 106 and the height of the handle 108 may provide the ease with which a blade 110 full of snow may be lifted as the handle 108 is lowered. Conversely, a ratio less than one-to-one (1:1) may aid in the throwing of snow or other materials, such as when the wheeled shovel 100 is being used by a stronger user and/or with lighter snow. Furthermore, differently shaped driving members can also contribute differently to the efficiency of the shovel.

FIG. 15 illustrates another exemplary embodiment of a wheeled shovel 200 embodying one or more aspects of the present disclosure. As shown in FIG. 15, the wheeled shovel 200 generally includes wheel assembly 202 having at least one wheel 204 and a driving member, frame, or yoke 206. A handle 208 is disposed at an upper end portion of the driving member 206. A shovel blade 210 is disposed at a lower end portion of the driving member 206. In addition, the wheeled shovel 200 also includes a hinge apparatus 212 with two frame linking members 214 that generally link or connect the upper and lower frame portions or members 207, 209.

With reference to FIGS. 15 through 19, the linking members 214 allow the upper frame member 207 (with the handle 208 attached thereto) to be folded or closed upon the lower frame member 209. In FIGS. 1-3, the wheeled shovel 200 is shown in an open, unfolded, or ready-for-use configuration at different handle height settings, whereas FIG. 19 illustrates the wheeled shovel 100 in a closed or folded configuration.

More specifically, FIG. 15 illustrates the wheeled shovel 200 in an open, unfolded, or ready-for-use configuration with the hinge apparatus 212 in a first or lowest handle height setting 216 (also shown in FIG. 20). FIG. 16 illustrates the wheeled shovel 200 in an open, unfolded, or ready-for-use configuration with the hinge apparatus 212 in a second or intermediate handle height setting 218 (the openings 218 for the second handle height setting are shown in FIG. 20) where the wheeled shovel's handle height H2 (FIG. 18) is higher than the handle height H1 when the hinge apparatus 212 is in the first handle height setting 216 (FIGS. 1 and 20). FIG. 17 illustrates the wheeled shovel 200 in an open, unfolded, or ready-for-use configuration with the hinge apparatus 212 in a third or highest handle height setting 220 (the openings 220 for the third handle height setting are also shown in FIG. 20) such that the wheeled shovel's handle height H3 (FIG. 18) is higher than the respective handle heights H1 or H2 when the hinge apparatus 212 is in the first handle height setting 216 (FIG. 15) or the second handle height setting 218 (FIG. 16).

FIG. 19 illustrates the wheeled shovel 200 in a closed or folded configuration in which the handle 208 is disposed rearward of the shovel blade 210 and the upper frame portion 207 has been pivoted relatively towards the lower frame portion 209 about the rod portion of the axle connector 222 (shown in FIG. 14).

With reference to FIG. 18, the aligned sets of openings 216, 218, 220 of the hinge apparatus 212 provide the wheeled shovel 200 with three different selectable handle heights. Continuing with this example, when the connector 226 is inserted through the corresponding set of openings 216 (FIG. 20), the first or lowest handle height setting is selected in which the handle 208 may be positioned at a height H1 of about forty-one inches above a datum plane (e.g., level ground or other surface supporting the wheeled shovel 200, etc.). In addition, the upper frame member 207 may be at a first angular orientation relative to the lower frame member 209 of about one hundred sixty seven degrees. By positioning the connector 226 through the second set of openings 218 (FIG. 20), the second or intermediate handle height setting is selected in which the handle 208 may be positioned at a height H2 of about forty-three inches above a datum plane, and the upper frame member 207 may be at a second angular orientation relative to the lower frame member 209 of about one hundred sixty degrees. By positioning the connector 226 through the second set of openings 220 (FIG. 14), the third or highest handle height setting is selected in which the handle 208 may be positioned at a height H3 of about forty-five inches above a datum plane, and the upper frame member 207 may be at a third angular orientation relative to the lower frame member 209 of about one hundred fifty two degrees. The dimensions and angular values provided in this paragraph (as are all dimensions and angular values set forth herein) are mere examples provided for purposes of illustration only, as the hinge apparatus may be configured so as to provide different angular value and/or dimensions depending, for example, on the particular application and/or user.

Other embodiments may include a hinge apparatus configured differently (e.g., different heights, different angular settings, more than three selectable handle heights, less than three selectable handle heights, etc.) than hinge apparatus 212. For example, FIG. 1 illustrates a hinge apparatus 112 that may be used with the wheeled shovel 100, which was described in more detail above. Other than the differences in the hinge apparatus 112 and 212, the wheeled shovel 200 may be similar to the wheeled shovel 100 already described in at least some embodiments thereof.

Accordingly, various exemplary embodiments provide wheeled shovels operable as manually-driven snow throwing devices, which may provide one or more of the following advantages. The wheeled shovel may be configured such that it can throw snow off the area being cleared, to the top of, or over, snow that may have accumulated at the edges of the area being cleared. In some embodiments, the particular geometry of a wheeled shovel has been carefully configured and tailored for this specific purpose. Advantageously, the wheeled shovel may be used for throwing snow to the top of or over adjacent snow instead of having to carry that snow to another location.

The geometry of a wheeled shovel may be derived from the user's anatomy and most effective motion, from a good starting and finishing position for the throwing action. In one example, a starting handle height was selected to be somewhat above the normal user's waist but below the user's chest, such as about forty inches. The finishing handle height (after completing the throwing motion) was selected to be somewhat above the normal user's knee, such as about twenty inches.

The wheeled shovel horizontal distances may be set up around a one-to-one leverage ratio with a bit of adjustment in either direction to allow for users of different sizes, weights and/or strengths. As disclosed herein, various exemplary embodiments allow the user to selectively adjust the handle height by changing which set of openings are used for the linking members of the hinge apparatus.

In various embodiments, a wheeled shovel may be designed such that back pain is avoided (or at least reduced) by allowing the use of body weight and leverage to lift and throw heavier loads (instead of relying on the user's muscle power alone for lifting and throwing the loads as is the case with most conventional shovels). Various wheeled shovel embodiments may allow snow or other materials to be shoveled with less effort and more rapidly than conventional snow shovels. As disclosed herein, some embodiments may provide these advantages by virtue of having a relatively large wheel on which the frame and shovel blade are attached and/or having a frame that is longer than most conventional shovels. The longer frame size may provide greater leverage for lifting snow, and the larger wheel diameter may provide a greater lifting height, easier rolling over rough terrain. Plus, attaching the frame at or near the wheel axle, the wheeled shovel may have greater maneuverability and ability to lift, accelerate, and throw loads while moving forward. This, in turn, may thereby enable much greater loads to be lifted and thrown (at generally greater heights and distances than when done with other shovel designs). This combination of design features may enable shoveling more snow and other materials with less effort and in significantly less time, and while also avoiding (or almost entirely avoiding in some embodiments) lower back strain from lifting.

In various embodiments, a wheeled shovel includes a main wheel that rolls in an exemplary manner similar to a bicycle wheel, but the wheel may be as large as three feet or more in diameter. The construction of the wheel may vary from spoked metal, molded spoked, plastic or other suitable materials, multi-piece construction (e.g., two removably attachable semi-circular sections for easier shipping and storage, etc.). The wheel may have a rubber tire that may or may not hold air pressure, but preferably compresses under a load.

By way of example only, FIG. 21 illustrates another embodiment of a wheeled shovel 300 embodying one or more aspects of the present disclosure. The wheeled shovel 300 may be similar to the wheeled shovel 100 shown in FIG. 1 and described above. As shown in FIG. 21, the wheeled shovel 300 includes a wheel assembly 302 that does not include first and second removably attachable pieces 104A and 104B that form a rim and a hub of the wheel assembly 102, as did the wheeled shovel 100 shown in FIG. 1. The wheel assembly 300 also includes a tire 305 on the rim.

FIG. 22 illustrates another embodiment of a wheeled shovel 400 embodying one or more aspects of the present disclosure. The wheeled shovel 400 may be similar to the wheeled shovel 100 shown in FIG. 1 and described above. As shown in FIG. 22, the wheeled shovel 400 includes an exemplary powder snow shovel extension/attachment 450 (also shown in FIG. 24) and an exemplary wear strip 454 (also shown in FIG. 25 along a leading edge portion of the shovel blade 410.

FIG. 23 illustrates an exemplary manner by which the powder snow shovel extension/attachment 450 may be attached to the shovel blade 410 via exemplary mechanical fasteners 452 (e.g., nut and bolt assemblies, etc.). When attached to the shovel blade 410, the snow shovel extension/attachment 450 increases the effective height of the shovel blade 410, for example, to facilitate shoveling of powder snow. Alternatively, other suitable fasteners and attachment methods may be used for attaching the powder snow shovel extension/attachment 450 to the shovel blade 410 in other embodiments.

FIG. 24 illustrates an exemplary manner by which the wear strip 454 may be attached along the leading edge portion of the shovel blade 410 via exemplary mechanical fasteners 456 (e.g., nut and bolt assemblies, etc.). When attached to the shovel blade 410, the wear strip 454 may, for example, reduce drag and resistance for the user when pushing the blade 410 and accumulating snow or other material in the blade 410. In some embodiments, the wear strip 454 may be made from plastic or other similar wear-resistant material. Alternatively, other materials may be used for the wear strip. In addition, other suitable fasteners and attachment methods may be used in other embodiments. For example, FIGS. 27 and 28 illustrate an exemplary snap-on wear strip 554 that is configured to allow the strip 554 to be disposed and releasably attached along a leading edge portion of a shovel blade without requiring the use of mechanical fasteners according to an exemplary embodiment.

FIG. 25 illustrates an exemplary manner by which a chipper plate 460 may be attached to a wheel shovel. As shown, the chipper plate 460 may be attached to a lower generally J-shaped end portion 461 of the lower frame member 409 via exemplary mechanical fasteners via exemplary mechanical fasteners 462 (e.g., nut and bolt assemblies, etc.). When attached, the chipper plate 460 is positioned generally under the shovel blade 410. The chipper plate 460 may be configured (e.g., sized, shaped, positioned relative to the shovel blade 410) to extend outwardly in front of the leading edge portion of the shovel blade 410. Accordingly, the chipper plate 460 may be used to chip or break ice, well-packed snow, or other materials as the wheeled shovel is moved generally forwardly. Alternatively, other suitable fasteners and attachment methods may be used for attaching a chipper plate in other embodiments.

Some embodiments may include under-blade wheels (or other low friction surfaces, such as gravel shoes, etc.) for increasing the ability to accumulate heavier loads with less forward force applied by the user. In such embodiments, under-blade wheels may be engaged when weighted and/or at the control of the user to lower or engage the wheels to reduce blade friction while pushing/accumulating snow or other material. Alternatively, this may be accomplished by constructing the under-blade wheels with springs (or other resilient biasing devices) that keep the shovel blade off the ground surface when desired by the user, and/or when greater force is applied to the shovel handle (such as when pushing a heavy load on the shovel blade. Another alternative for engaging under-blade wheels under load is to attach the blade to the frame with a spring-loaded hinge. The spring-loaded hinge could be configured to keep the blade aligned with the frame angle (relative to the ground, for example). But when under force from the frame (under load), the spring-loaded hinge could be configured to sufficiently flex to thereby reduce the shovel blade angle relative to the ground for bringing the under-blade wheels into contact with the ground.

By way of example, FIG. 26 illustrates an exemplary manner by which the roller/wheel assembly 464 may be attached to a wheel shovel. As shown, the roller/wheel assembly 464 may be attached to a lower generally J-shaped end portion 461 of the lower frame member 409 via exemplary mechanical fasteners 466 (e.g., nut and bolt assemblies, etc.). When attached, the rollers/wheels 468 of the assembly 464 are positioned generally under the shovel blade 410 and may help ease travel of the shovel blade 410 over rough ground, such as a gravel-covered surface. FIG. 27 also illustrates an exemplary attachment manner for the rollers/wheels 468. Alternatively, other suitable fasteners and attachment methods may be used in other embodiments for the rollers/wheels 468 and/or for the assembly 464.

In other embodiments, a wheeled shovel may include one or more, or none, of the optional accessories just described above, e.g., powder snow shovel extension/attachment 450, wear strip 454 or 554, chipper plate 460, roller/wheel assembly 464, combinations thereof, etc.

During use of an embodiment of a wheeled shovel, tire compression and/or flexing of the frame may enhance the ability to throw snow or other materials from the shovel blade. As the handle is pushed downwardly, the shovel blade accelerates and may cause the forward portion of the frame to flex in generally opposite direction in response to the shovel blade acceleration, and may also cause the tire to compress, all due to the force applied to the handle by the user. The frame and tire returning to their original or initial shapes may provide additional force and speed to the load being thrown. Depending on the particular application, sufficient shovel blade acceleration may cause the wheeled shovel to lift off the ground as the load is released or thrown from the blade.

As disclosed herein, various embodiments allow for adjustability to the handle height. This handle adjustability may allow the wheeled shovel to accommodate various user heights and body types, as well as to enable the user to optimize (or at least improve) the biomechanics associated with the use of the wheeled shovel by tailoring and selectively adjusting the dimensions to the user. In addition to the hinge apparatus disclosed herein, some embodiments may also include a handle portion that is slidably extendable or retractable in a telescoping manner relative to the frame. Additionally, or alternatively, the handle may be removably attachable to the frame at one or more different attachment positions on the frame such that the handle's positioning, height, and/or length may be selectively changed depending on which particular attachment location is used for the handle. In various embodiments, the handle may also be configured to be attached to the frame in a first orientation or a second orientation by flipping the handle over. Additionally, or alternatively, some embodiments may allow the handle to be attached to the topside or underside of the frame, which, in turn, may thus allow adjustability to the handle positioning, height, and/or length.

In some embodiments, a wheeled shovel may be configured with a flexible blade and/or a flexible wheel construction to enhance the ability to throw a load of material. For example, a shovel blade may be constructed with sufficient flexibility such that the blade flexes or bends as a load is accelerated, thereby creating an enhanced trampoline effect as the blade flexes back to its original shape. This may enhance the ability to throw a load of material for a given amount of force and speed applied to the handle. Or, for example, other embodiments may include springs built into the shovel blade for augmenting the throwing capacity of a wheeled shovel from the blade and frame flexing. The springs may compress when weighted and accelerated (under load), and then expand as the load begins to unload from the blade thereby increasing throwing capacity.

In some embodiments, a wheeled shovel may have a multi-piece construction (e.g., FIG. 1, etc.) such that the wheeled shovel may be broken down into several pieces for ease of shipping, storage, and/or transportation (e.g., in a car trunk, etc.). By way of example only, some embodiments include a detachable wheel and detachable shovel blade. In further embodiments, the frame may also be broken down into subcomponents or be collapsible, foldable, or telescopic to a more compact configuration.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A wheeled shovel comprising:
    a frame having an upper frame member and a lower frame member;
    a handle disposed at an upper end portion of the upper frame member;
    a shovel blade disposed at a lower end portion of the lower frame member;
    a wheel assembly having a wheel and an opening configured to receive a portion of an axle connector;
    a hinge apparatus including:
        a first linking member disposed at a lower end portion of the upper frame member;
        a second linking member disposed at an upper end portion of the lower frame member;
        the first and second linking members including axle connector openings configured to receive a portion of the axle connector, for attaching the wheel assembly when the axle connector is engaged with the opening of the wheel assembly and the axle connector openings of the first and second linking members;
        the first and second linking members including first and second sets of openings configured to receive a portion of a connector, for selective adjustment to the handle height through an angular orientation of the upper frame member to the lower frame member;
    wherein the upper frame member is at a first angular orientation relative to the lower frame member and the handle is at a first handle height, when the connector is engaged with the first set of openings and the wheeled shovel is in a first open, ready-for-use configuration;
    wherein the upper frame member is at a second angular orientation relative to the lower frame member less than the first angular orientation such that the handle is at a second handle height higher than the first handle height, when the connector is engaged with the second set of openings and the wheeled shovel is in a second open, ready-for-use configuration; and
    wherein the upper frame member is pivotably movable relative to the lower frame member about the axle connector to a closed, collapsed configuration in which the upper frame member is alongside the lower frame member and the handle is adjacent the shovel blade, when the connector is not engaged with the first or second set of openings.

2. The wheeled shovel of claim 1, wherein the first and second linking members are identical.

3. The wheeled shovel of claim 1, wherein the first and second linking members include a third set of openings configured to receive a portion of a connector, such that the upper frame member is at a third angular orientation relative to the lower frame member less than the second angular orientation such that the handle is at a third handle height higher than the second handle height, when the connector is engaged with the third set of openings and the wheeled shovel is in a third open, ready-for-use configuration.

4. The wheeled shovel of claim 3, wherein the first, second, and third sets of openings are in a generally triangular configuration relative to the corresponding portion of each linking member defining the corresponding openings.

5. The wheeled shovel of claim 1, wherein each of the first and second linking members includes:
   a base portion;
   spaced-apart sidewalls extending outwardly from the base portion and configured for receiving a portion of the respective upper and lower frame member generally between the spaced-apart sidewalls; and
   spaced-apart flange portions extending outwardly beyond the base portion in a direction generally opposite the sidewalls, the flange portions having openings defining the first and second sets of openings.

6. The wheeled shovel of claim 1, wherein the axle connector openings are lower than the first and second sets of openings when the wheeled shovel is in the first or second open, ready-for-use configuration.

7. The wheeled shovel of claim 1, wherein:
   the upper frame member is alongside the lower frame member in the closed, collapsed configuration after being pivoted about the axle connector in a first direction; and
   when the axle connector is disengaged, the upper frame member is pivotably movable relative to the lower frame member in a second direction generally opposite the first direction about the connector engaged with either the first or second set of openings of the first and second linking members to a second closed, collapsed configuration in which the upper frame member is alongside the lower frame member.

8. The wheeled shovel of claim 1, wherein:
   the handle is rearward of the shovel blade when the upper frame member is alongside the lower frame member in the closed, collapsed configuration after being pivoted about the axle connector in a first direction; and
   when the axle connector is disengaged, the upper frame member is pivotably movable relative to the lower frame member in a second direction generally opposite the first direction about the connector engaged with either the first or second set of openings of the first and second linking members to a second closed, collapsed configuration in which the upper frame member is alongside the lower frame member and the handle is forward of the shovel blade.

9. The wheeled shovel of claim 1, wherein the connector and the axle connector comprise quick release connectors having rod portions with openings for engaging pins.

10. The wheeled shovel of claim 1, further comprising a snap-on wear strip attachable along a leading edge portion of the shovel blade without requiring mechanical fasteners.

11. The wheeled shovel of claim 1, wherein the first and second sets of openings are offset outside the portions of the first and second linking members attached to the upper and lower frame members when the wheeled shovel is in the first or second open, ready-for-use configuration, whereby the offset allows the upper and lower frame members to be pivotably movable relative to each other about the axle connector into a closed, collapsed configuration in which the upper frame member is immediately adjacent the lower frame member, when the connector is not engaged with the first or second set of openings.

* * * * *